United States Patent
Otsuki et al.

(10) Patent No.: US 7,869,897 B2
(45) Date of Patent: Jan. 11, 2011

(54) NUMERICAL CONTROL METHOD FOR FIVE-AXIS PROCESSING MACHINE

(75) Inventors: Toshiaki Otsuki, Yamanashi (JP); Soichiro Ide, Yamanashi (JP); Takeshi Miyazaki, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 351 days.

(21) Appl. No.: 12/081,757

(22) Filed: Apr. 21, 2008

(65) Prior Publication Data

US 2008/0288103 A1 Nov. 20, 2008

(30) Foreign Application Priority Data

May 17, 2007 (JP) .............................. 2007-131435

(51) Int. Cl.
*G06F 19/00* (2006.01)

(52) U.S. Cl. ....................................... 700/189; 700/159

(58) Field of Classification Search ................. 700/189, 700/181, 159, 169
See application file for complete search history.

(56) References Cited

U.S. PATENT DOCUMENTS 5,813,287 A * 9/1998 McMurtry et al. ....... 74/490.06
6,145,405 A * 11/2000 McMurtry et al. ....... 74/490.07
6,336,375 B1 * 1/2002 McMurtry et al. ....... 74/490.07
2003/0120376 A1  6/2003 Shibata et al.

FOREIGN PATENT DOCUMENTS

| JP | 9-254062 | 9/1997 |
| JP | 2004-220435 | 8/2004 |
| JP | 2005-182437 | 7/2005 |

OTHER PUBLICATIONS

Japanese Notice of Reasons for Rejection mailed Sep. 9, 2008 issued in JP Application No. 2007-131435 (including a partial translation thereof).

* cited by examiner

*Primary Examiner*—Kidest Bahta
(74) *Attorney, Agent, or Firm*—Drinker Biddle & Reath LLP

(57) ABSTRACT

If the angle $\alpha$ formed between the interpolated cutting surface perpendicular direction vector (It, Jt, Kt) and the interpolated tool direction vector (Ttx, Tty, Ttz) becomes smaller, movement of a tool becomes unstable. In this case, the tool diameter compensation vector (TCx, TCy, TCz) is set to the tool diameter compensation vector calculated in the immediately previous interpolation cycle, thereby preventing unstable movement. Further, in case of a block instruction where a distance between positions in cutting point instructions is large whereas distance of movement of linear axis control point is small, an excessive cutting may occur. To deal with this problem, movement of linear axis control point in a current block is stopped or converted into linear movement so as to prevent a loop-shaped movement of the linear axis control point.

4 Claims, 11 Drawing Sheets

FIG. 4 PRIOR ART

G43.8 H01 D01;          CUTTING POINT INSTRUCTION, TOOL LENGTH COMPENSATION
                        NUMBER 01, TOOL DIAMETER COMPENSATION NUMBER 01

$Xx_0\ Yy_0\ Zz_0\ Aa_0\ Cc_0\ Ii_0\ Jj_0\ Kk_0;$
$Xx_1\ Yy_1\ Zz_1\ Aa_1\ Cc_1\ Ii_1\ Jj_1\ Kk_1;$
$\cdots$
$Xx_i\ Yy_i\ Zz_i\ Aa_i\ Cc_i\ Ii_i\ Jj_i\ Kk_i;$
$\cdots$
$Xx_n\ Yy_n\ Zz_n\ Aa_n\ Cc_n\ Ii_n\ Jj_n\ Kk_n;$ CUTTING POINT INSTRUCTION (X, Y, Z),
TOOL DIRECTION INSTRUCTION (A, C),
CUTTING SURFACE PERPENDICULAR
DIRECTION INSTRUCTION (I, J, K)

G49;                    CANCEL

FIG. 5 PRIOR ART

| COMPENSATION NO | TOOL DIAMETER COMPENSATION AMOUNT (TR) | TOOL LENGTH COMPENSATION AMOUNT (TL) | CORNER RADIUS COMPENSATION AMOUNT (CR) |
|---|---|---|---|
| 01 | 3.8 | 50.0 | 3.8 |
| 02 | 5.0 | 62.5 | 2.0 |
| 03 | 2.3 | 45.6 | 0.0 |

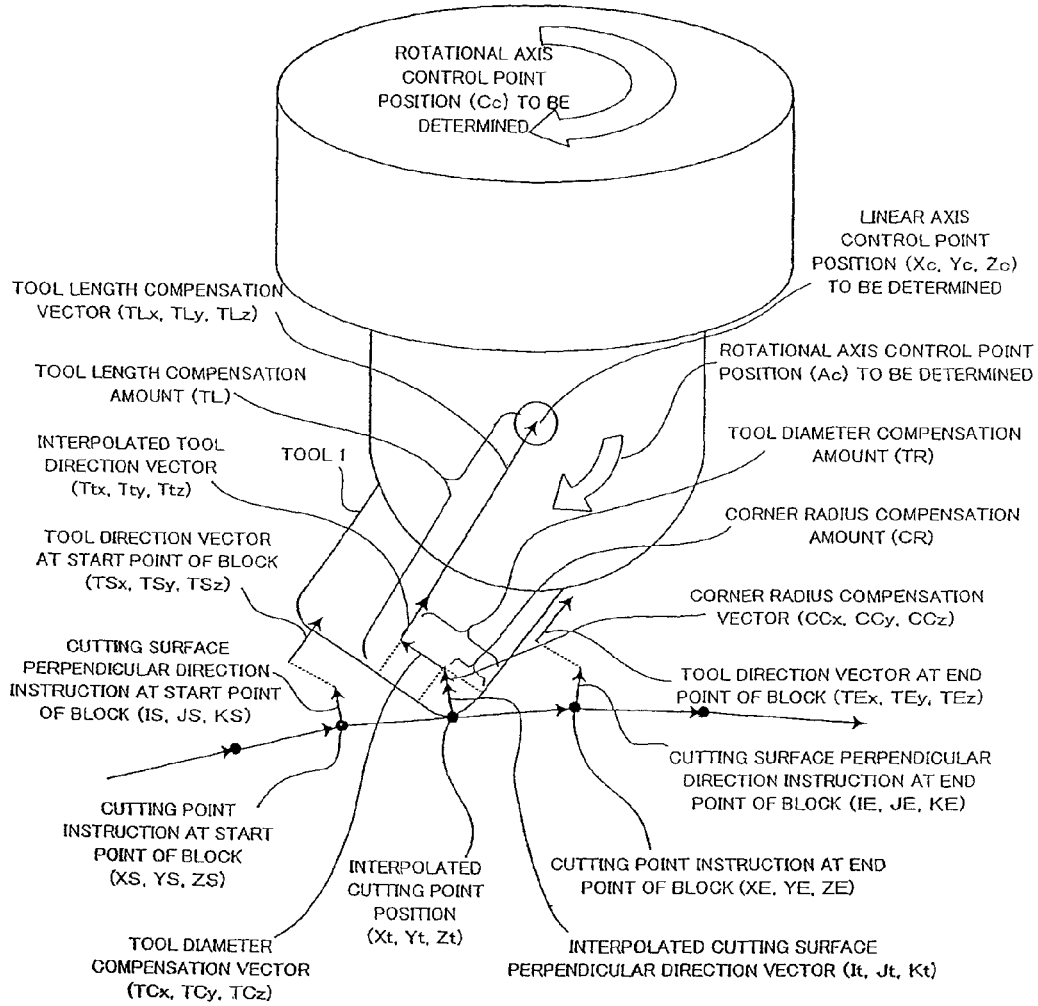

CUTTING POINT INSTRUCTION, TOOL LENGTH COMPENSATIC NUMBER 02 TOOL DIAMETER COMPENSATION NUMBER 02 (INCLUDING CORNER RADIUS COMPENSATION AMOUNT)

CUTTING POINT INSTRUCTION (X, Y, Z),
TOOL DIRECTION INSTRUCTION (A, C),
CUTTING SURFACE PERPENDICULAR
DIRECTION INSTRUCTION (I, J, K)

CANCEL

NUMERICAL CONTROL METHOD FOR FIVE-AXIS PROCESSING MACHINE

BACKGROUND OF THE INVENTION

1. Field of the Invention

The present invention relates to a numerical control method for controlling a five-axis processing machine having two rotational axes and three linear axes, and also relates to operational control in the proximity of singular points where there is a possibility of the occurrence of unstable movement.

2. Description of the Related Art

There is already known a five-axis processing machine which carries out processing by moving a tool relatively in three linear axis directions with respect to a workpiece (processing object), as well as inclining the tool relatively with respect to the workpiece about two rotational axes. For example, there is known a processing method using a five-axis processing machine which processes a curved surface by performing curve interpolation, on the basis of command point sequence data created by a CAD/CAM apparatus or an associated apparatus, and a command vector sequence which instructs the angles of inclination of the workpiece and the tool, wherein smooth processed surfaces are obtained by interpolation of a smooth curve which is approximate to a prescribed curve (see Japanese Patent Application Laid-Open No. 2005-182437).

Furthermore, in a five-axis processing machine, if the position and attitude of a tool are indicated in terms of a perpendicular coordinates system which is fixed with respect to the work object, and the tool is moved at a certain speed, and if the machine has a singular point (singular attitude) within its range of operation, then the speed and acceleration of the respective machine joints may exceed the tolerable values for those joints. Consequently, a joint interpolation range is determined on the basis of the attitude at two time points, in such a manner that the error in the attitude of the tool between the two time points assigned to the tool is equal to or less than a tolerable value, and the attitude of the tool is controlled within this joint interpolation range by means of joint interpolation (namely, interpolation for determining the values of the joint coordinates of the respective axes, on the basis of the positional vector and the attitude vector at the two points) (see Japanese Patent Application Laid-Open No. 2004-220435). By this means, if the speed and the acceleration of the respective joints becomes excessively large in the proximity of a singular point, then the speed of movement is restricted as far as possible, while satisfying the required accuracy in respect of error in the path of travel.

A cutting point, which is where a workpiece is actually processed by a tool, differs from a control point, which is the position to which the tool is controlled with respect to the workpiece.

FIG. 1 is a diagram showing the relationship between a cutting point which is indicated when using a ball end mill as a tool 1, and the controlled tool position, in a five-axis processing machine having three linear axes, X, Y, Z, and two rotational axes, axis A which rotates about the X axis, and axis C which rotates about the Z axis.

A cutting point is instructed in the form of a position (X, Y, Z) of the X, Y, Z axes in the perpendicular coordinates system corresponding to the linear axes X, Y, Z. The control point for controlling the position of the tool 1 with respect to the workpiece in response to this cutting point instruction (X, Y, Z), is not the point where the tip of the tool 1 makes contact with the workpiece (cutting point instruction point), but rather a linear axis position (Xc, Yc, Zc) which is separated from this cutting point instruction point, and therefore the instructed cutting point position (X, Y, Z) does not coincide with the linear axis position (Xc, Yc, Zc) corresponding to same.

The linear axis position (Xc, Yc, Zc) is determined by applying tool diameter compensation and tool length compensation, and this linear axis position (Xc, Yc, Zc) and the rotational axis positions (A, C) are controlled accordingly. The tool diameter compensation is determined on the basis of a cutting surface perpendicular direction instruction (I, J, K) which is instructed together with the cutting point position (X, Y, Z), and an established tool diameter compensation amount TR. The tool length compensation is determined on the basis of the tool direction which is specified by the instructions supplied to the respective rotational axes, the A axis and the C axis, the established tool diameter compensation amount TR, and the tool length compensation amount TL.

As described above, the instructed cutting point position (X, Y, Z) does not coincide with the position of the tool 1 with respect to the workpiece, in other words, with the position (Xc, Yc, Zc) of the controlled linear axes. The same applies in cases where a square end mill, which has a square-shaped cross-section when rotated about the main shaft, or a radius end mill which has a curved radius applied to the corners of the tool, is used instead of a ball end mill, and here also, the instructed cutting point position does not coincide with the controlled linear axis position.

However, in general, it is desirable that the interval between the instructed cutting points should be similar to the movement of the control point. In other words, it is desirable that if the interval between the instructed cutting points is small, then the corresponding movement of the control point is also small, and if the interval between the instructed cutting points is large, then the corresponding movement of the control point is also large.

For example, in a square end mill, the general relationship between an instructed cutting point and a control point is as shown in FIG. 2. As shown in FIG. 2, it is desirable that there should be a substantially proportional relationship between the distance between the cutting point instructions (XS, YS, ZS), (XE, YE, ZE) which are the start point and the end point of the instructions for one block, and the distance between the start point and end point of the linear axis control point (Xc, Yc, Zc) used to drive the tool 1 in the instructions for that block. However, depending on the instructed shape and the type of tool, the interval between the instructed cutting points may differ greatly from the movement of the control point. More specifically, there are cases where the interval between the instructed cutting points is small but the corresponding control point is moved by a large amount (a case such as that shown in FIG. 9 described below), or cases where the interval between the instructed cutting points is large but the corresponding control point is moved by a small amount (a case such as that shown in FIG. 10 described below) (hereinafter, cases of these kinds are referred to as "the proximity of a singular point").

In the proximity of a singular point of this kind, where there is a large difference between the interval between the instructed control points and the corresponding movement of the control point, undesirable situations, such as unstable operation and/or excessive cutting into the processing object, may occur. The present invention resolves problems of this kind.

Firstly, before explaining these problems, a description is given of the principles and the operation of processing control based on cutting point instructions as executed conventionally by a controller such as a numerical controller which controls a five-axis processing machine.

(Ball End Mill)

FIG. 3 is an illustrative operational diagram of a case where a ball end mill is used as a tool 1 and is controlled by determining the positions of three linear axes X, Y, Z, and two rotational axes, A and C, by means of cutting point instructions. In this case, a program such as that shown in FIG. 4 is used as the processing program.

FIG. 4 illustrates the processing program on the left-hand side of the drawing, accompanied by an explanation of the processing program, on the right-hand side. "G43.8" indicates a cutting point instruction code, "H01" indicates that the tool length compensation number is "01" (in other words, that the tool length compensation amount indicated by this tool length compensation number is to be used), and "D01" indicates that the tool diameter compensation number is "01" (in other words, that the tool diameter compensation amount indicated by this tool diameter compensation number is to be used). Furthermore, "X_Y_Z_A_C_I_J_K_" is a block of cutting point instructions, "X_Y_Z_" is a cutting point instruction which indicates the position of a cutting point in terms of the X, Y, Z axes of a perpendicular coordinates system, "A_C_" is a tool direction instruction, and "I_J_K_" is an instruction which specifies the direction perpendicular to the cutting surface, at the cutting point. Furthermore, "G49" is an instruction which cancels and terminates the processing control based on that cutting point instruction.

Moreover, the tool diameter compensation amount TR, the tool length compensation amount TL, and the corner radius compensation amount CR, which is described hereinafter, are set as parameters for each respective compensation number. FIG. 5 shows an example of the tool compensation amount settings. If the corner radius compensation amount CR is set to "0.0", then this indicates that there is no corner radius, and means that the tool is a square end mill. Furthermore, if the tool diameter compensation amount TR is set to the same numerical figure as the corner radius compensation amount CR, then this means that the tool is a ball end mill. In the example shown in FIG. 5, the compensation number "01" indicates a ball end mill, the compensation number "02" indicates a radius end mill, and the compensation number "03" indicates a square end mill.

The controller reads in the instructions of one block (X, Y, Z, A, C, I, J, K), from the processing program. The block cutting point instruction (X, Y, Z) thus read in is taken as the cutting point instruction (XE, YE, ZE) at the end point of the current block, and the block cutting point instruction (X, Y, Z) read in respect of the immediately previous block is taken as the cutting point instruction (XS, YS, ZS) at the start point of the current block. Similarly, the cutting surface perpendicular direction instruction (I, J, K) read in from the processing program is taken as the cutting surface perpendicular direction instruction (IE, JE, KE) at the end point of the current block, and the cutting surface perpendicular direction instruction (I, J, K) read in the immediately previous block is taken as the cutting surface perpendicular direction instruction (IS, JS, KS) at the start point of the current block.

(1) Respective interpolated cutting point positions (Xt, Yt, Zt) are determined by carrying out interpolation processing at each interpolation cycle, from the position of the cutting point instruction (XS, YS, ZS) at the start point of a block until the position of the cutting point instruction (XE, YE, ZE) at the end point of the block.

(2) Similarly, respective interpolated cutting surface perpendicular direction vectors (It, Jt, Kt) (at each of the interpolated cutting point positions (Xt, Yt, Zt)) are determined by carrying out interpolation processing at each interpolation cycle, from the cutting surface perpendicular direction instruction (IS, JS, KS) at the start point of a block until the cutting surface perpendicular direction instruction (IE, JE, KE) at the end point of the block. It should be noted that the interpolated cutting surface perpendicular direction vector (It, Jt, Kt) is determined in terms of a unit vectors.

(3) The tool diameter compensation amount TR (set as a parameter) is multiplied by the interpolated cutting surface perpendicular direction vector (It, Jt, Kt), to derive a tool diameter compensation vector (TCx, TCy, TCz).

(4) The tool direction vector (TSx, TSy, TSz) at the start point of a block and the tool direction vector (TEx, TEy, TEz) at the end point of the block are determined from the tool direction instructions A, C at the start point and the end point of the block which has been read in. If the tool direction instruction at the start point of a block is taken as AS, CS, and the tool direction instruction at the end point of the block is taken as AE, CE, then the vectors are derived as follows:

$TSx=-\cos(CS)\sin(AS)$ $TSy=-\sin(CS)\sin(AS)$ $TSz=\cos(AS)$ $TEx=-\cos(CE)\sin(AE)$ $TEy=-\sin(CE)\sin(AE)$ $TEz=\cos(AE)$ (5) The interpolated tool direction vector (Ttx, Tty, Ttz) is determined by carrying out interpolation processing from the tool direction vector (TSx, TSy, TSz) at the start point of a block until the tool direction vector (TEx, TEy, TEz) at the end point of the block. The interpolated tool direction vector (Ttx, Tty, Ttz) is also determined in terms of unit vectors.

(6) A tool length compensation vector (TLx, TLy, TLz) is determined by multiplying the interpolated tool direction vector (Ttx, Tty, Ttz) by the difference (TL−TR) between the tool diameter compensation amount TR and the tool length compensation amount TL.

(7) The linear axis control point position (Xc, Yc, Zc) is determined by adding the tool diameter compensation vector (TCx, TCy, TCz) and tool length compensation vector (TLx, TLy, TLz) to the interpolated cutting point position (Xt, Yt, Zt). This linear axis control point position (Xc, Yc, Zc) is the movement position of the linear axes (X, Y, Z axes) in the interpolation cycle.

(8) The interpolated tool direction vector (Ttx, Tty, Ttz) is converted into rotational axis control point positions (Ac, Cc). These converted rotational axis control point positions (Ac, Cc) are the positions to which the rotational axes (A, C axes) are moved in each interpolation cycle.

$Ac=\arccos(Ttz)$ $Cc=\arctan(Tty/Ttx)$

By means of the processing described above, the linear axis control point position (Xc, Yc, Zc) and the rotational axis control point positions (Ac, Cc) are determined for each interpolation cycle, and processing is carried out by driving and controlling the servo motors which drive the respective axes in order that they are moved to these positions.

(Square End Mill)

FIG. 6 is an illustrative diagram of processing for determining a linear axis control position and rotational axis control positions according to the cutting point instruction, for each interpolation cycle, in a case where the tool 1 used is a square end mill. In this case, the processing program is the same as the processing program shown in FIG. 4, and a tool length compensation number ("H03") and a tool diameter compensation number ("D03") are instructed. The compensation number "03" is selected from the tool compensation amount settings examples shown in FIG. 5, and since the corner radius compensation amount CR is set to "0.0", then a square end mill is designated.

(1) The controller reads in the instructions for one block (X, Y, Z, A, C, I, J, K) from the processing program, and determines respective interpolated cutting point positions (Xt, Yt, Zt) by carrying out interpolation processing at each interpolation cycle, from the position of the cutting point instruction (XS, YS, ZS) at the start point of a block until the position of the cutting point instruction (XE, YE, ZE) at the end point of the block.

(2) Then, respective interpolated cutting surface perpendicular direction vectors (It, Jt, Kt) are determined by carrying out interpolation processing at each interpolation cycle, from the cutting surface perpendicular direction instruction (IS, JS, KS) at the start point of a block until the cutting surface perpendicular direction instruction (IE, JE, KE) at the end point of the block. It should be noted that the interpolated cutting surface perpendicular direction vector (It, Jt, Kt) is determined in terms of unit vectors.

(3) The tool direction vector (TSX, TSy, TSz) at the start point of a block and the tool direction vector (TEx, TEy, TEz) at the end point of the block are determined from the tool direction instructions A, C at the start point and the end point of the block which has been read in. This is determined by the same method as that described for the ball end mill in (4) above.

(4) The interpolated tool direction vector (Ttx, Tty, Ttz) is determined by interpolation from the tool direction vector (TSx, TSy, TSz) at the start point of a block until the tool direction vector (TEx, TEy, TEz) at the end point of the block. The interpolated tool direction vector (Ttx, Tty, Ttz) is also determined in terms of unit vectors.

(5) The tool diameter compensation vector (TCx, TCy, TCz) is determined by rotating the interpolated tool direction vector (Ttx, Tty, Ttz) through 90° in the plane formed by the interpolated tool direction vector (Ttx, Tty, Ttz) and the interpolated cutting surface perpendicular direction vector (It, Jt, Kt), and then multiplying the rotated direction vector by the tool diameter compensation amount TR. Below, the method for rotating the interpolated tool direction vector (Ttx, Tty, Ttz) through 90° is described.

Firstly, the external product vector (Vx, Vy, Vz) of the interpolated tool direction vector (Ttx, Tty, Ttz) and the interpolated cutting surface perpendicular direction vector (It, Jt, Kt) is determined.

$$(Vx, Vy, Vz) = (Ttx, Tty, Ttz) \times (It, Jt, Kt)$$

This external product vector (Vx, Vy, Vz) is a vector which is perpendicular to the plane formed by the interpolated tool direction vector (Ttx, Tty, Ttz) and the interpolated cutting surface perpendicular direction vector (It, Jt, Kt). Thereupon, the unit vector (VNx, VNy, VNz) of the external product vector (Vx, Vy, Vz) is determined, and by rotating the interpolated tool direction vector (Ttx, Tty, Ttz) through 90° about this unit vector (VNx, VNy, VNz), then an interpolated tool direction vector (Ttx, Tty, Ttz) which has been rotated through 90° is obtained. A general method for rotating a certain vector through a certain angle about a certain unit vector is described in "Computer Graphics" (David F. Rogers, J. Alan Adams), etc.

(6) The tool length compensation vector (TLx, TLy, TLz) is determined by multiplying the interpolated tool direction vector (Ttx, Tty, Ttz) by the tool length compensation amount TL.

(7) The linear axis control point position (Xc, Yc, Zc) is determined by adding the tool diameter compensation vector (TCx, TCy, TCz) and tool length compensation vector (TLx, TLy, TLz) to the interpolated cutting point position (Xt, Yt, Zt). This linear axis control point position (Xc, Yc, Zc) is the movement position of the linear axes (X, Y, Z axes) in the interpolation cycle.

(8) The interpolated tool direction vector (Ttx, Tty, Ttz) is converted into rotational axis control point positions (Ac, Cc). These converted rotational axis control point positions (Ac, Cc) are the positions to which the rotational axes (A, C axes) are moved in each interpolation cycle. This method of conversion is implemented similarly to the abovementioned ball end mill.

By means of the processing described above, the linear axis control point position (Xc, Yc, Zc) and the rotational axis control point positions (Ac, Cc) are determined at each interpolation cycle, and processing is carried out by controlling and driving the servo motors which drive the respective axes, in such a manner that the axes are moved to these positions.

(Radius End Mill)

FIG. 7 is an illustrative diagram of processing for determining the linear axis control point position and the rotational axis control point positions, for each respective interpolation cycle, on the basis of a cutting point instruction, in a case where the tool 1 is a radius end mill. FIG. 8 shows an example of the processing program used in this case. This processing program is the same as that shown in FIG. 4, but in this case, the tool length compensation number "H02" and the tool diameter compensation number "D02" are indicated, and hence the compensation number 02 is selected from the tool compensation amount settings example shown in FIG. 5, and since the corner radius compensation amount CR is "2.0", then a radius end mill is specified. Apart from this, the procedure is the same as the example shown in FIG. 4.

(1) The controller reads in the block instruction (X, Y, Z, A, C, I, J, K) from the processing program, and determines respective interpolated cutting point positions (Xt, Yt, Zt) by carrying out interpolation processing at each interpolation cycle, from the position of the cutting point instruction (XS, YS, ZS) at the start point of a block, until the cutting point instruction (XE, YE, ZE) at the end point of the block.

(2) Respective interpolated cutting surface perpendicular direction vectors (It, Jt, Kt) are determined for each interpolation cycle, by carrying out interpolation processing from the cutting surface perpendicular direction instruction (IS, JS, KS) at the start point of a block until the cutting surface perpendicular direction instruction (IE, JE, KE) at the end point of the block. The interpolated cutting surface perpendicular direction vectors (It, Jt, Kt) are determined in terms of unit vectors.

(3) The tool direction vector (TSx, TSy, TSz) at the start point of a block and the tool direction vector (TEx, TEy, TEz) at the end point of the block are determined from the tool direction instructions A, C at the start point and end point of the block read in. The method for determining these vectors is the same as that described above in step (4) for a ball end mill.

(4) Respective interpolated tool direction vectors (Ttx, Tty, Ttz) are determined by carrying out interpolation processing from the tool direction vector (TSx, TSy, TSz) at the start point of a block until the tool direction vector (TEx, TEy, TEz) at the end point of the block. These interpolated tool direction vectors (Ttx, Tty, Ttz) are also determined in unit vectors.

(5) A corner radius compensation vector (CCx, CCy, CCz) is determined by multiplying the corner radius compensation amount CR by the interpolated cutting surface perpendicular direction vector (It, Jt, Kt).

(6) The interpolated tool direction vector (Ttx, Tty, Ttz) in the plane formed by the interpolated tool direction vector (Ttx, Tty, Ttz) and the interpolated cutting surface perpendicular direction vector (It, Jt, Kt) is rotated through 90° (the method of rotation is the same as in the case of the square end mill), and a tool diameter compensation vector (TCx, TCy, TCz) is determined by multiplying the vector which has been rotated through 90°, by the difference (TR−CR) between tool diameter compensation amount TR and the corner radius compensation amount CR.

(7) A tool length compensation vector (TLx, TLy, TLz) is determined by multiplying the interpolated tool direction vector (Ttx, Tty, Ttz) by the difference (TL−CR) between the tool length compensation amount TL and the corner radius compensation amount CR.

(8) A linear axis control point position (Xc, Yc, Zc) is determined by adding the corner radius compensation vector (CCx, CCy, CCz), the tool diameter compensation vector (TCx, TCy, TCz), and the tool length compensation vector (TLx, TLy, TLz), to the interpolated cutting point position (Xt, Yt, Zt). This linear axis control point position (Xc, Yc, Zc) is the movement position of the linear axes (X, Y, Z axes) in the interpolation cycle.

(9) The tool direction vector (Ttx, Tty, Ttz) is converted to rotational axis control point positions (Ac, Cc). The converted rotational axis control point positions (Ac, Cc) are the positions to which the rotational axes (A, C axes) are moved at each interpolation cycle. The conversion method is the same as that for a ball end mill described above.

In this way, processing is carried out by driving and controlling the servo motors which drive the axes, in such a manner that the axes are moved to the linear axis control point position (Xc, Yc, Zc) and the rotational axis control point positions (Ac, Cc) determined at each respective interpolation cycle.

As described above, the aforementioned interpolation processing is performed in respect of the linear axes (X, Y, Z axes) and the rotational axes (A, C axes) when carrying out processing by instructing a sequence of cutting points, and processing is executed on the basis of the movement instructions for each interpolation cycle. During the course of this processing, control may become unstable in the proximity of the singular points described above, and excessive cutting may be performed. FIG. 9 is an illustrative diagram of the proximity of singular points where control becomes unstable. This example relates to a case of instability in control occurring at a singular point where the interval between the cutting point instructions is small, but the movement distance of the control point is large (below, this singular point is called "singular point 1"). This singular point 1 occurs under conditions such as those described below.

(a) The tool direction vector (TSx, TSy, TSz) at the start point of the block is close to the direction (orientation) of the cutting surface perpendicular direction instruction (IS, JS, KS).

(b) The tool direction vector (TSx, TSy, TSz) at the start point of a block is close to the direction of the tool direction vector (TEx, TEy, TEz) at the end point of the block.

(c) The tool direction vector (TEx, TEy, TEz) at the end point of the block is close to the direction of the cutting surface perpendicular direction instruction (IE, JE, KE) at the end point, and there is a large difference in direction between the outer product vector (Vx, Vy, Vz) which is the vector perpendicular to the surface formed by the vectors (TEx, TEy, TEz) and (IE, JE, KE), and the outer product vector (Vx, Vy, Vz) which is the vector perpendicular to the surface formed by the tool direction vector (TSx, TSy, TSz) at the start point of the block and the cutting surface perpendicular direction instruction (IS, JS, KS) at the start point (for example, the directional difference is approximately 180°). In the example shown in FIG. 9, if the respective vectors at the start point and the end point of the block are situated in the same plane, then the outer product vector (Vx, Vy, Vz) at the start point of a block and the outer product vector (Vx, Vy, Vz) at the end point of the block have opposite signs, and differ by 180°. Therefore, the tool diameter compensation vector (TCx, TCy, TCz), which is obtained by rotating the interpolated tool direction vector (Ttx, Tty, Ttz) through 90° about the unit vector of this outer product vector (Vx, Vy, Vz) and then multiplying by the tool diameter compensation amount TR, will change greatly (for example, through approximately 180°) in accordance with the large change in the outer product vector. FIG. 9 shows an example where the tool diameter compensation vector (TCx, TCy, TCz) changes by approximately 180°.

If the conditions in (a), (b) and (c) above arise, then even if the interval between cutting points (instruction points) is small, the corresponding movement of the control point (Xc, Yc, Zc) is large, and therefore a state such as that illustrated in FIG. 9 occurs. The example shown in FIG. 9 indicates a case where at the start point of a block, the right-hand side of the tool 1 is indicated as the cutting point, but at the end point of the block, the left-hand side of the tool 1 is indicated at the cutting point. Therefore, a movement which is approximately two times the tool diameter compensation amount is produced during the block. Since the tool diameter compensation vector (TCx, TCy, TCz) changes significantly in this way, then the control point (Xc, Yc, Zc) also changes, and the operation becomes unstable.

Situations where the control operation becomes unstable due to singular points of this kind also occur when processing with a radius end mill, as well as when processing with a square end mill as described above.

Next, a case is described in which the intervals between the positions of the cutting point instructions are large, but the movement of the control point when processing these intervals is small, and excessive cutting occurs at a singular point where the tool moves in a loop fashion (this singular point is called "singular point 2" below).

FIG. 10 is an illustrative movement diagram of this singular point 2. This singular point occurs under conditions such as the following.

(a) Where the position of the linear axis control point (Xc, Yc, Zc) at the start point of a block and the linear axis control point (Xc, Yc, Zc) at the end point of the block are close together (below, the linear axis control point at the start point of a block is represented as "(XSc, YSc, ZSc)" and the linear axis control point at the end point of the block is represented as "(XEc, YEc, ZEc)").

(b) The tool direction vector (TSx, TSy, TSz) at the start point of a block and the tool direction vector (TEx, TEy, TEz) at the end point of the block are close together.

(c) The distance between the cutting point instruction (XS, YS, ZS) at the start point of a block and the cutting point instruction (XE, YE, ZE) at the end point of the block is relatively large, and there is a large difference between the directions of the cutting surface perpendicular direction instruction (IS, JS, KS) at the start point of a block and that of the cutting surface perpendicular direction instruction (IE, JS, KE) at the end point of the block.

In the example shown in FIG. 10, there is a large difference between the directions of the cutting surface perpendicular direction instruction (IS, JS, KS) at the start point of a block and that of the cutting surface perpendicular direction instruction (IE, JE, KE) at the end point of the block, and there is also a large difference between the directions of the tool diameter compensation vector (TCSx, TCSy, TCSz) at the start point and the tool diameter compensation vector (TCEx, TCEy, TCEz) at the end point. The directions of the tool direction vector (TSx, TSy, TSz) at the start point of a block and the tool direction vector (TEx, TEy, TEz) at the end point of the block are close together, the tool length compensation vector (TLx, TLy, TLz) at the start point of a block and the tool length compensation vector (TLx, TLy, TLz) at the end point of the block are mutually superimposed, and the position of the linear axis control point, which is determined by adding the tool diameter compensation vector and the tool length compensation vector to the cutting point instruction, performs a small loop-shaped movement. In the example shown in FIG. 10, it is expected that the linear axis control point will not move during the instruction block, but in actual fact, it performs a loop-shaped movement as indicated by the dotted arrow. As a result, there is a problem in that the tool cuts into the processing object, or the like.

The problem of excessive cutting due to the singular point 2, where the distance between instructions in the cutting point instructions is small whereas the distance of movement of the control point is large, also occurs in cases where a square end mill or a radius end mill is used, as well as cases where a ball end mill is used as described above.

SUMMARY OF THE INVENTION

Therefore, it is an object of the present invention to provide a method of controlling a five-axis processing machine having three linear axes and two rotational axes whereby it is possible to prevent unstable movement in the vicinity of a singular point and excessive cutting into a processing object, as described above.

In a first mode of the numerical control method for controlling a five-axis processing machine according to the present invention, a milling tool which does not have a corner radius section is used, control points for the respective axes are determined at respective interpolation cycles, based on a tool diameter compensation amount and a tool length compensation amount which are set in advance, and also on cutting points, a cutting surface perpendicular direction and a tool direction which are instructed by a processing program, and in which the respective axes are driven and controlled to positions of the control points thus determined. This method further comprises step of determining, at each interpolation cycle, an interpolated cutting point position, an interpolated cutting surface perpendicular direction vector, an interpolated tool direction vector, a tool diameter compensation vector, and a tool length compensation vector, based on the tool diameter compensation amount and tool length compensation amount which are set in advance, and also on the cutting point, cutting surface perpendicular direction and tool direction which are instructed by a processing program; step of determining, in cases where an angle formed between the interpolated cutting surface perpendicular direction vector and the interpolated tool direction vector is smaller than a predetermined first set value, a linear axis control point by taking the tool diameter compensation vector for the current interpolation cycle as the tool diameter compensation vector calculated in the interpolation cycle immediately before the angle become smaller, and by adding this tool diameter compensation vector and the tool length compensation vector to the interpolated cutting point position; and step of determining, in cases where in the calculation of the tool diameter compensation vector in subsequent interpolation cycles the angle formed between the interpolated cutting surface perpendicular direction vector and the interpolated tool direction vector has become greater than the first set value, the linear axis control point by adding the tool diameter compensation vector and the tool length compensation vector which are determined in the interpolation cycle immediately after the angle has become greater, to the interpolated cutting point position, and moving the linear axis control point thus determined at a pre-designated speed. By means of the numerical control method according to this mode, it is possible to stabilize the processing in the proximity of a singular point, where operation becomes unstable.

In a second mode of a numerical control method which controls a five-axis processing machine according to the present invention, a milling tool which has a corner radius section is used, control points for the respective axes are determined at respective interpolation cycles, based on a predetermined tool diameter compensation amount, a corner radius compensation amount and tool length compensation amount which are set in advance, and also on a processing program in which cutting points, a cutting surface perpendicular direction and a tool direction are instructed, and in which the respective axes are driven and controlled to positions of the control points thus determined. This method further comprises step of determining, at each interpolation cycle, an interpolated cutting point position, an interpolated cutting surface perpendicular direction vector, an interpolated tool direction vector, a tool diameter compensation vector, a corner radius compensation vector, and a tool length compensation vector, based on the tool diameter compensation amount, corner radius compensation amount and tool length compensation amount which are set in advance, and also on the cutting point, cutting surface perpendicular direction and tool direction which are instructed by a processing program; step of determining, in cases where an angle formed between the interpolated-cutting surface perpendicular direction vector and the interpolated tool direction vector is smaller than a predetermined first set value, a linear axis control point by taking the tool diameter compensation vector for the current interpolation cycle as the tool diameter compensation vector calculated in the interpolation cycle immediately before the angle become smaller, and by adding this tool diameter compensation vector, and the corner radius compensation vector and the tool length compensation vector, to the interpolated cutting point position; and step of determining, in cases where the angle formed between the interpolated cutting surface perpendicular direction vector and the interpolated tool direction vector has become greater than the first set value in subsequent interpolation cycles, the linear axis control point by adding the tool diameter compensation vector, the corner radius compensation vector and the tool length compensation vector which are determined in the interpolation cycle immediately after the angle has become greater, to the interpolated cutting point position, and moving the linear axis control point thus determined at a pre-designated speed. By means of the numerical control method according to this mode, it is possible to stabilize the processing in the proximity of a singular point, where operation becomes unstable.

In a third mode of a numerical control method for controlling a five-axis processing machine according to the present invention, a milling tool which does not have a corner radius section or a ball end mill is used, linear axis control points and rotational axis control points are determined at respective interpolation cycles, based on a tool diameter compensation amount and a tool length compensation amount which are set in advance, and also on cutting points, a cutting surface perpendicular direction and a tool direction which are instructed by a processing program, and in which the respective axes are driven and controlled to positions of the respective control points thus determined. This method further comprises step of determining a cutting point position and a linear axis control point respectively at a start point and an end point for each of blocks thereof; and step of assuming that the linear axis control point at the end point of the current block is equal to the linear axis control point at the start point of the current block so that movement of the linear axis in accordance with the instructions in the current block does not occur, when judgment is made that a distance between the linear axis control points at the start point and the end point of the block is smaller than a predetermined second set value, and that a distance between the cutting point positions at the start point and the end point of the block is greater than a predetermined third set value, or when judgment is made that a ratio of the distance between the linear axis control points at the start point and the end point of the block to the distance between the cutting point positions at the start point and the end point of the block is less than a predetermined fourth set value. By means of the numerical control method according to this mode, it is possible to prevent the occurrence of excessive cutting in the proximity of a singular point where the linear axes move in a loop shape.

A fourth mode of the numerical control method for controlling a five-axis processing machine corresponds to the third mode of the numerical control method in which "assuming that the linear axis control point at the end point of the current block is equal to the linear axis control point at the start point of the current block so that movement of the linear axis in accordance with the instructions in the current block does not occur" in the third mode is replaced with "setting the instruction of the current block to a linear movement instruction".

In a fifth mode of a numerical control method for controlling a five-axis processing machine, a milling tool which has a corner radius section is used, linear axis control points and rotational axis control points are determined at respective interpolation cycles, based on a predetermined tool diameter compensation amount, a corner radius compensation amount and a tool length compensation amount which are set in advance, and also on cutting points, a cutting surface perpendicular direction and a tool direction which are instructed by a processing program, and in which the respective axes are driven and controlled to positions of the respective control points thus determined. This method further comprises step of determining a cutting point position and a linear axis control point respectively at a start point and an end point for each of blocks thereof; and step of assuming that the linear axis control point at the end point of the current block is equal to the linear axis control point at the start point of the current block so that movement of the linear axis in accordance with the instructions in the current block does not occur, when judgment is made that a distance between the linear axis control points at the start point and the end point of the block is smaller than a predetermined second set value, and that a distance between the cutting point positions at the start point and the end point of the block is greater than a predetermined third set value, or when judgment is made that a ratio of the distance between the linear axis control points at the start point and the end point of the block to the distance between the cutting point positions at the start point and the end point of the block is less than a predetermined fourth set value. By means of the numerical control method according to this mode, it is possible to prevent the occurrence of excessive cutting in the proximity of a singular point where the linear axes move in a loop shape.

A sixth mode of the numerical control method for controlling a five-axis processing machine corresponds to the fifth mode of the numerical control method in which "assuming that the linear axis control point at the end point of the current block is equal to the linear axis control point at the start point of the current block so that movement of the linear axis in accordance with the instructions in the current block does not occur" in the fifth mode is replaced with "setting the instruction of the current block to a linear movement instruction".

By adopting the composition described above, the present invention is able to prevent unstable operation arising at singular points where the interval between instructions in the cutting point instructions is small but the movement distance of the linear axis control point is large, in a five-axis processing machine having three linear axes and two rotational axes. Furthermore, it is also possible to prevent excessive cutting arising at a singular point where the interval between the positions of the cutting point instructions is large but the movement of the control point when processing between these points is small.

BRIEF DESCRIPTION OF THE DRAWINGS

The aforementioned and other objects and characteristics of the present invention will become evident from the following description of embodiments with reference to the accompanying drawings, wherein:

FIG. 4 is a diagram showing an example of a program based on cutting point instructions specifying a ball end mill as the tool;

FIG. 5 is a diagram showing an example of tool compensation amount settings;

FIG. 7 is a diagram for describing movement when the positions of three linear axes, X, Y, Z and two rotational axes, A, C, are determined and controlled on the basis of cutting point instructions, in a case where the tool used is a radius end mill;

FIG. 8 is a diagram showing an example of a program based on cutting point instructions specifying a radius end mill as the tool;

DESCRIPTION OF THE PREFERRED EMBODIMENTS

Figure 11:
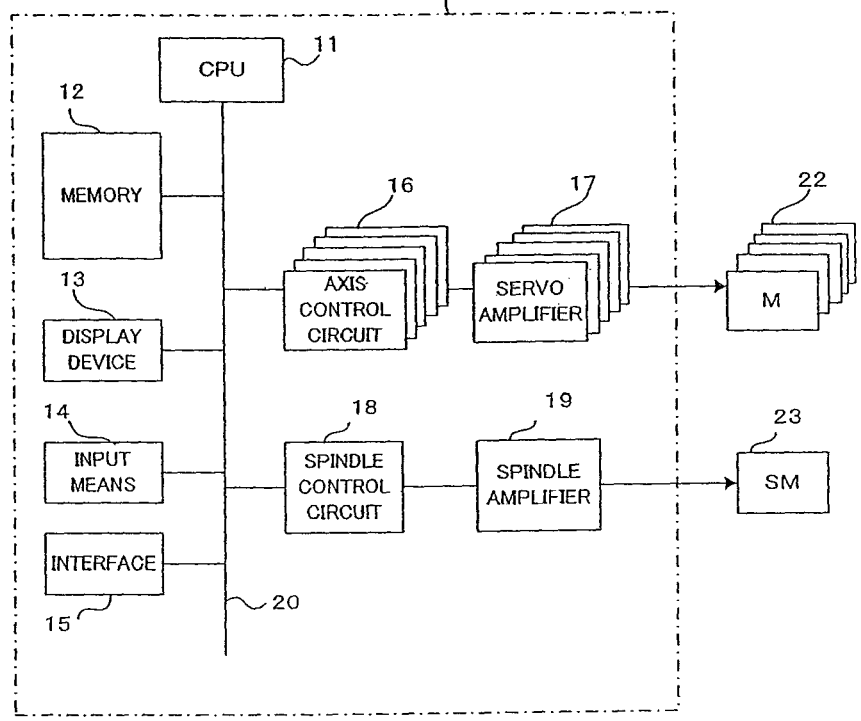
FIG. 11 is a principal block diagram of a numerical controller for carrying out one embodiment of the numerical control method according to the present invention.

FIG. 11 is a principal block diagram of a numerical controller for carrying out one embodiment of the numerical control method according to the present invention.

The CPU 11 is a processor which executes overall control of the numerical controller 10. This processor 11 is connected respectively via a bus 20, to a memory 12, a display device 13, an input device 14 such as a keyboard, an interface 15, an axis control circuit 16 for each of the respective axes which drive and control the servo motors of the axes, a spindle control circuit 18 which drives and controls the spindle (main shaft), and the like. The memory 12 is constituted by a ROM, RAM, FRAM, or the like. The processor 11 reads out, via the bus 20, a system program stored in the memory 12 and controls the whole of the numerical controller in accordance with the system program thus read out. Moreover, the memory 12 is stored with a processing program, such as a program constituted by cutting point instructions read in via the interface 15, various processing programs input via the display device 13 and the input device 14, and various data such as settings data, and the like. In relation to the present invention, the numerical controller shown in FIG. 11 differs from a conventional controller in that software for determining the vicinities of the singular point 1 and the singular point 2 described above and preventing unstable operation and excessive cutting is stored in the memory 12.

The axis control circuit 16 of the respective axes receives a movement instruction amount for the respective axes from the processor 11, and position and speed feedback signals from position/speed detectors which are respectively built into the servo motors 22 of the respective axes, and it performs feedback control of the position and speed and outputs a command for the respective axes to the servo amplifier 17. Upon receiving this command, the servo amplifier 17 drives the respective servo motors 22 of the respective axes (X axis, Y axis, Z axis, A axis, C axis) of the machine (control object). In FIG. 11, the feedback of the position and speed are omitted from the drawings.

Furthermore, the spindle control circuit 18 receives a main shaft rotation instruction from the processor 11 and speed feedback from the speed detector which detects the rotational speed of the main shaft, and implements feedback control of the speed so as to output a spindle speed signal to the spindle amplifier 19. The spindle amplifier 19 receives the spindle speed signal and causes the spindle motor 23 to rotate at the instruction speed of rotation.

The hardware composition of the numerical controller described above is the same as that of the prior art, the point of difference being that software for determining the singular point 1 and the singular point 2 described above and thereby preventing unstable operation and excessive cutting is stored additionally in the memory 12.

To begin with, a first embodiment of a numerical control method according to the present invention which eliminates operational instability in the proximity of the singular point 1 will be described with reference to FIG. 12 and FIG. 13.

Figure 12:
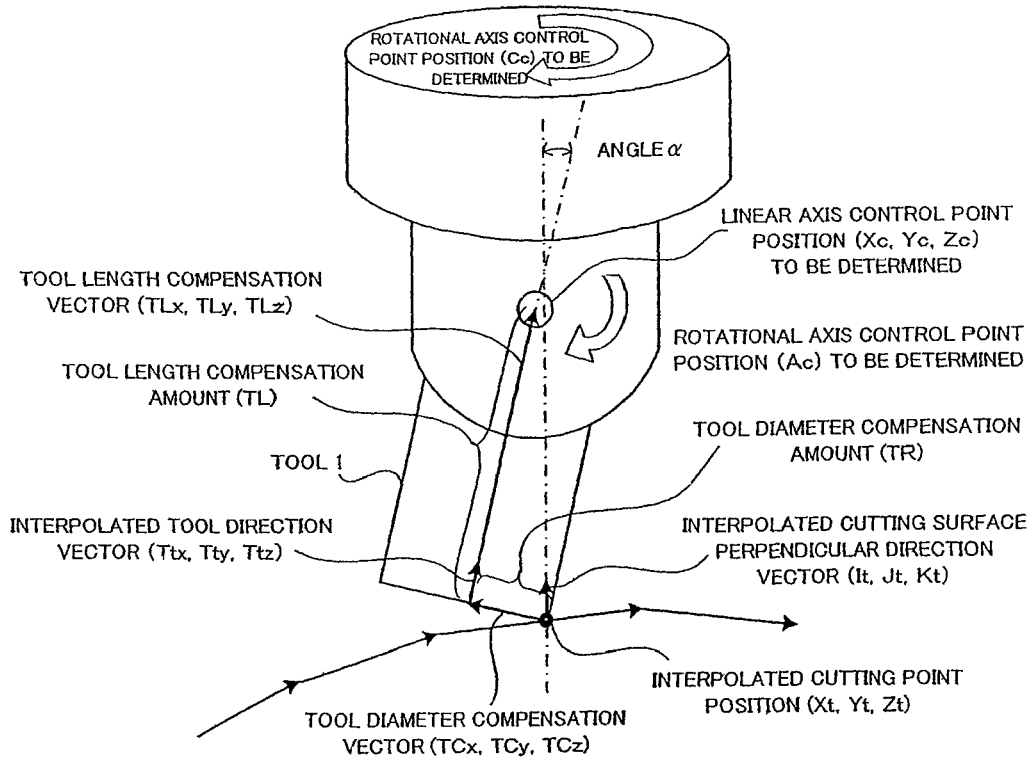
FIG. 12 is a diagram for describing a singular point determination process and a process for avoiding unstable movement when a singular point has been determined, in a first embodiment of the numerical control method according to the present invention.

FIG. 12 is a diagram describing a process for determining a singular point 1, and a process for avoiding unstable movement when the singular point 1 is determined.

As described previously, when the interpolated cutting surface perpendicular direction vector (It, Jt, Kt) is determined and the interpolated tool direction vector (Ttx, Tty, Ttz) is determined, then the angle $\alpha$ formed between these two vectors is found and it is judged whether or not this angle $\alpha$ is smaller than a previously set parameter value ($Prm(\alpha)$). If the angle $\alpha$ is smaller than the set value ($Prm(\alpha)$), then this means that the front end plane of the square end mill or the radius mill, and the processing plane are in a state close to parallel, and hence there is a high possibility of satisfying the conditions (a) to (c) under which the singular point 1 described above occurs, and there is a high possibility of being in the proximity of a singular point 1. Therefore, whenever it is determined that the angle $\alpha$ is smaller than the set value ($Prm(\alpha)$), the tool diameter compensation vector (TCx, TCy, TCz) is set to the tool diameter compensation vector (TCx, TCy, TCz) of the (immediately) previous interpolation cycle (hereinafter, the tool diameter compensation vector of the immediately previous interpolation cycle is represented as "$TC0x$, $TC0y$, $TC0z$"), and the respective axes are controlled by determining the linear axis control point position (Xc, Yc, Zc) and the rotational axis control point positions (Ac, Cc) accordingly.

Figure 9:
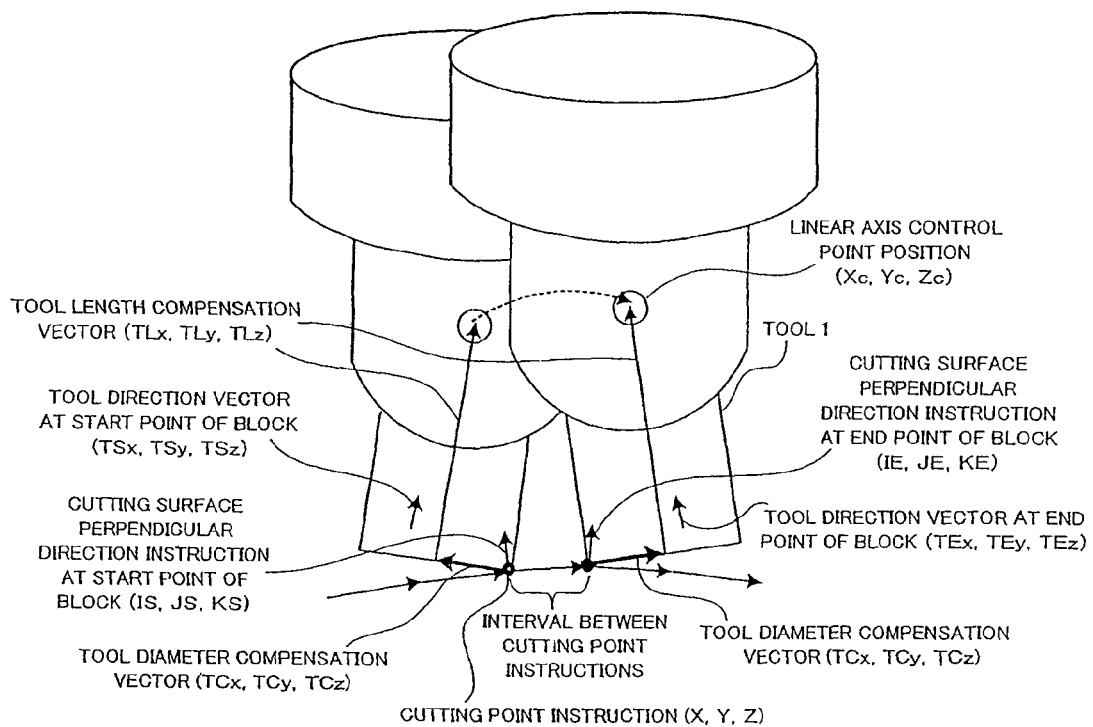
FIG. 9 is an illustrative diagram of the proximity of a singular point where movement becomes unstable.
Figure 10:
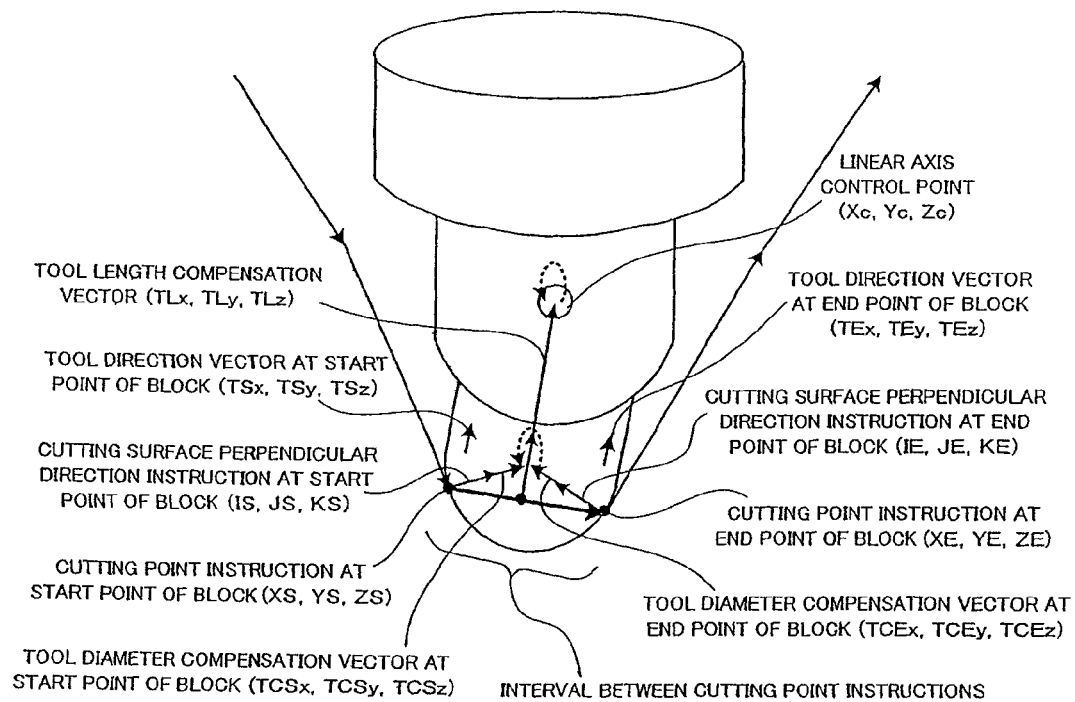
FIG. 10 is an illustrative diagram of the proximity of a singular point where excessive cutting occurs.

As described above in relation to FIG. 9, if the tool diameter compensation vector (TCx, TCy, TCz) changes significantly, the linear axis control point position (Xc, Yc, Zc) varies, thereby making the movement unstable. For this reason, as explained above, the tool diameter compensation vector (TCx, TCy, TCz) is set to the tool diameter compensation vector ($TC0x$, $TC0y$, $TC0z$) of the (immediately) previous interpolation cycle so as not to change the tool diameter compensation vector (TCx, TCy, TCz). As a result, the singular point 1 is eliminated and instability of the movement is removed.

It is judged whether or not the angle $\alpha$ formed between the interpolated cutting surface perpendicular direction vector (It, Jt, Kt) and the interpolated tool direction vector (Ttx, Tty, Ttz) is smaller than the set value ($Prm(\alpha)$), by obtaining the internal product of the interpolated cutting surface perpendicular direction vector (It, Jt, Kt) and the interpolated tool direction vector (Ttx, Tty, Ttz), and making judgement on the basis of the internal product thus determined.

In other words: given that $$\cos(\alpha) = (Ttx, Tty, Ttz) \cdot (It, Jt, Kt)$$

then if $\cos(\alpha) > \cos(\text{Prm}(\alpha))$, the angle $\alpha$ is judged to be smaller than the set value ($\text{Prm}(\alpha)$).

Moreover, in the present embodiment, once the tool has been considered to be in the proximity of a singular point 1 and the tool diameter compensation vector (TC0x, TC0y, TC0z) of the immediately previous interpolation cycle has been used, if it is subsequently judged that the angle $\alpha$ has become larger than the set value ($\text{Prm}(\alpha)$) and the singular point 1 has been eliminated, the processing reverts to determining the position of the control point on the basis of the current tool diameter compensation vector (TCx, TCy, TCz), as usual. Upon reverting to normal processing in this way, it is possible to select one of two procedures: either to set the movement speed of the control point to the instruction speed (method 1), or to set the movement speed of the control point to the maximum speed (method 2).

Figure 13:
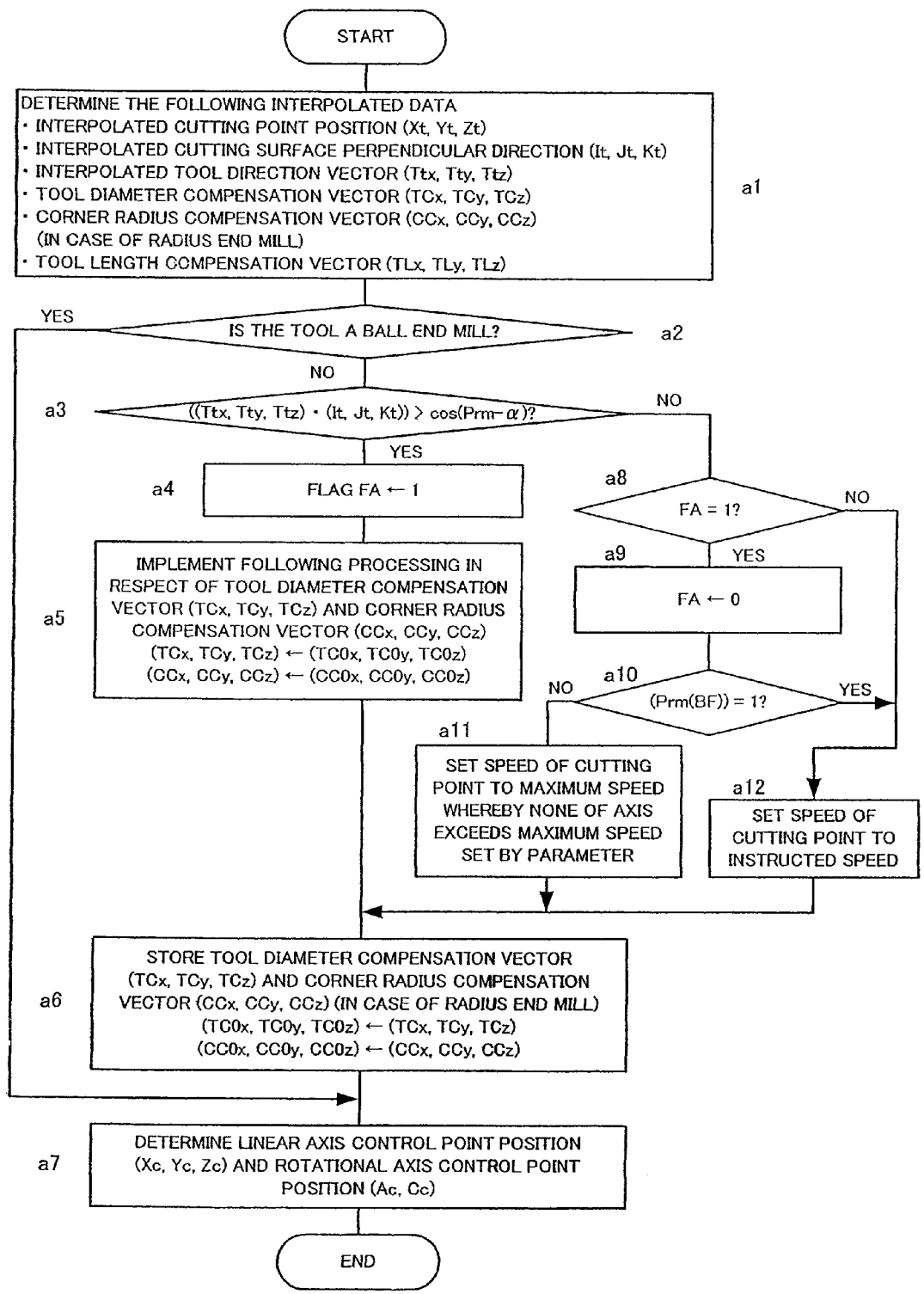
FIG. 13 is a processing flowchart for each interpolation cycle, which shows an algorithm centered on a singular point determination process and a process for preventing unstable movement in the proximity of a singular point, in a first embodiment of a numerical control method according to the present invention.

FIG. 13 is a flowchart of the processing carried out for each interpolation cycle, which shows an algorithm centered on processing for determining a singular point 1 and processing for preventing unstable operation in the proximity of the singular point in the first embodiment.

Firstly, as in the prior art, the processor 11 of the numerical controller reads in a block of instructions (X, Y, Z, A, C, I, J, K) from the processing program, and carries out interpolation processing, as in the prior art, in order to obtain:

the interpolated cutting point position (Xt, Yt, Zt);

the interpolated cutting surface perpendicular direction vector (It, Jt, Kt), the interpolated tool direction vector (Ttx, Tty, Ttz);

the tool diameter compensation vector (TCx, TCy, TCz); and the tool length compensation vector (TLx, TLy, TLz).

Furthermore, if a radius end mill is designated, then in addition to the positions and vectors described above, it also determines (in step a1):

the corner radius compensation vector (CCx, CCy, CCz).

The procedure is the same as the prior art in respect of determining the positions and vectors described above, at each interpolation cycle.

Next, it is judged whether or not the tool specified by the program is a ball end mill (step a2). If a ball end mill is designated, the phenomenon of the singular point 1 does not occur, and therefore the procedure proceeds to step a7, and similarly to the prior art, the linear axis control point position and the rotational axis control point positions are determined, the movement instructions to the respective axis positions thus determined are output to the respective axis control circuits 16, and the servo motors 22 of the respective axes are driven and controlled accordingly.

On the other hand, at step a2, if the designated tool is a square end mill or a radius end mill (rather than a ball end mill), then the procedure proceeds to step a3, and it is judged whether or not the value of the internal product of the interpolated cutting surface perpendicular direction vector (It, Jt, Kt) and the interpolated tool direction vector (Ttx, Tty, Ttz) is greater than the cosine of the value (Prm ($\alpha$)) set as a parameter, namely, $\cos(\text{Prm}(\alpha))$, thereby judging whether or not the angle $\alpha$ formed by the interpolated cutting surface perpendicular direction vector (It, Jt, Kt) and the interpolated tool direction vector (Ttx, Tty, Ttz) is smaller than the set value ($\text{Prm}(\alpha)$).

In other words, given that $\cos(\alpha) = (Ttx, Tty, Ttz) \cdot (It, Jt, Kt)$, then if $\cos(\alpha) > \cos(\text{Prm}(\alpha))$, it is judged that $\alpha < \text{Prm}(\alpha)$, whereas if $\cos(\alpha) < \cos(\text{Prm}(\alpha))$, it is judged that $\alpha > \text{Prm}(\alpha)$.

If it is judged that the angle $\alpha$ is not smaller than the set value ($\text{Prm}(\alpha)$) (in other words, if it is judged that $\alpha \geq \text{Prm}(\alpha)$), then it is next judged whether or not the flag FA is set to "1" (step a8). The flag FA is set to "0" in an initial setting.

If the flag FA is not "1", then the speed of the cutting point is set to the speed specified by the program (step a12). The tool diameter compensation vector (TCx, TCy, TCz) and the corner radius compensation vector (CCx, CCy, CCz) which are determined in Step a1 in the current processing cycle are stored in a register which stores the tool diameter compensation vector (TC0x, TC0y, TC0z) of the previous interpolation cycle (and also a register which stores the corner radius compensation vector (CC0x, CC0y, CC0z) of the previous interpolation cycle, in case where a radius end mill is designated).

Furthermore, the linear axis control point position and the rotational axis control point positions are determined.

In other words, if the designated tool is a square end mill, then the linear axis control point position (Xc, Yc, Zc) is determined by adding the tool diameter compensation vector (TCx, TCy, TCz) and the tool length compensation vector (TLx, TLy, TLz) to the interpolated cutting point position (Xt, Yt, Zt), and furthermore, the rotational axis control point positions (Ac, Cc) are determined from the interpolated tool direction vector (Ttx, Tty, Ttz).

If, on the other hand, the designated tool is a radius end mill, then the linear axis control point position (Xc, Yc, Zc) is determined by adding the corner radius compensation vector (CCx, CCy, CCz), the tool diameter compensation vector (TCx, TCy, TCz) and the tool length compensation vector (TLx, TLy, TLz) to the interpolated cutting point position (Xt, Yt, Zt), and furthermore, the rotational axis control point positions (Ac, Cc) are determined from the interpolated tool direction vector (Ttx, Tty, Ttz) (step a7).

Movement instructions to the positions of the respective axes which have been determined in this way are output to the respective axis control circuits 16, and are used to drive and control the servo motors 22 of the respective axes.

On the other hand, at step a3, if it is judged that the angle $\alpha$ formed between the interpolated cutting surface perpendicular direction vector (It, Jt, Kt) and the interpolated tool direction vector (Ttx, Tty, Ttz) is smaller than the set value (Prm ($\alpha$)) ($\alpha < \text{Prm}(\alpha)$), then the flag FA is set to "1" (step a4), the tool diameter compensation vector (TC0x, TC0y, TC0z) of the previous interpolation cycle, which is stored in the register, is set as the tool diameter compensation vector (TCx, TCy, TCz) for the current interpolation cycle, and the corner radius compensation vector (CC0x, CC0y, CC0z) of the previous interpolation cycle is set as the corner radius compensation vector (CCx, CCy, CCz) for the current interpolation cycle (step a5).

Next, the processing in step a6 described above is executed, the tool diameter compensation vector (TCx, TCy, TCz) and the corner radius compensation vector (CCx, CCy, CCz) used in the current interpolation cycle are stored in the register, and hence become the "tool diameter compensation vector (TC0x, TC0y, TC0z) and the corner radius compensation vector (CC0x, CC0y, CC0z) of the previous interpolation cycle" in the case of the next interpolation cycle.

Thereupon, the processing in step a7 described above is executed, and the linear axis control point position (Xc, Yc, Zc) and the rotational axis control point positions (Ac, Cc) are determined. In this case, at step a5, the tool diameter compensation vector (TCx, TCy, TCz) and the corner radius compensation vector (CCx, CCy, CCz) are set respectively to the tool diameter compensation vector (TC0x, TC0y, TC0z) of the previous interpolation cycle and the corner radius compensation vector (CC0x, CC0y, CC0z) of the previous interpolation cycle, and therefore the linear axis control point position (Xc, Yc, Zc) and the rotational axis control point positions (Ac, Cc) are determined. As a result, the corner radius compensation vector (CCx, CCy, CCz) and the tool diameter compensation vector (TCx, TCy, TCz) are stabilized and the singular point 1 is eliminated, allowing an unstable movement to be prevented. It should be noted that great variation of the tool diameter compensation vector (TCx, TCy, TCz) will cause instability of the linear axis control point position (Xc, Yc, Zc) significantly, so it is important, in this case, to stabilize the tool diameter compensation vector (TCx, TCy, TCz).

In this way, provided that it is judged at step a3 that the angle α formed between the interpolated cutting surface perpendicular direction vector (It, Jt, Kt) and the interpolated tool direction vector (Ttx, Tty, Ttz) is smaller than the established value (Prm(α)) (namely, α<Prm(α)) (in other words, provided that the judgment is Yes), then the processing in steps a1 to a7 is carried out for each respective interpolation cycle, and the linear axis control point position (Xc, Yc, Zc) and the rotational axis control point positions (Ac, Cc) are determined in such a manner that the angle α formed between the interpolated cutting surface perpendicular direction vector (It, Jt, Kt) and the interpolated tool direction vector (Ttx, Tty, Ttz) is not smaller than the set value (Prm(α)), and the respective axes are controlled so as to move to these positions.

At step a3, if it is judged that the angle α L formed between the interpolated cutting surface perpendicular direction vector (It, Jt, Kt) and the interpolated tool direction vector (Ttx, Tty, Ttz) is greater than the set value (Prm(α)) (in other words, it is judged that α>Prm(α) (in other words, provided that the judgment is No), then at the following step a8, if the flag FA is judged to be "1" (if it has been judged that the angle α L is smaller than the set value (Prm(α)) until the previous interpolation cycle, but it has been judged that α>(Prm(α)) in the current interpolation cycle), then the flag FA is set to "0" (step a9), and thereafter, it is judged whether or not the set parameter (Prm(BF)) is set to "1" (step a10).

The settings parameter (Prm(BF)) is the movement speed used for the cutting point, and it is set to the indicated speed or the maximum speed. If this set parameter (Prm(BF)) is set to "1", then the movement speed of the cutting point is set to the instructed speed (step a12). On the other hand, if the set parameter (Prm(BF)) is set to "0", then the movement speed of the cutting point is changed to a maximum speed within a range where none of the axes exceeds the maximum speed set by the parameter (step a11). The reason for changing the speed of the cutting point from the instruction speed to the maximum speed is because in an interpolation cycle where it has at first been considered that the tool is in the proximity of a singular point 1 and it is then judged that in actuality there is no singular point 1, there is a risk that the tool may move with a sudden speed, and therefore it is sought to prevent the tool from being moved with an excessive speed in this way.

In this way, the speed of the cutting point is changed or maintained, and the procedure then proceeds to step a6.

In the next interpolation cycle, at step a1, the respective data are determined by carrying out interpolation processing at the set speed, but if the speed of the cutting point has been changed to the maximum speed by the processing in step a11 of the preceding interpolation cycle, then interpolation processing is carried out at this maximum speed, and the respective data are determined accordingly.

In the next cycle, since the flag FA has been set to "0" at step a9, then the procedure proceeds from step a8 to step a12 and the speed is returned to the standard instructed speed.

Figure 14:
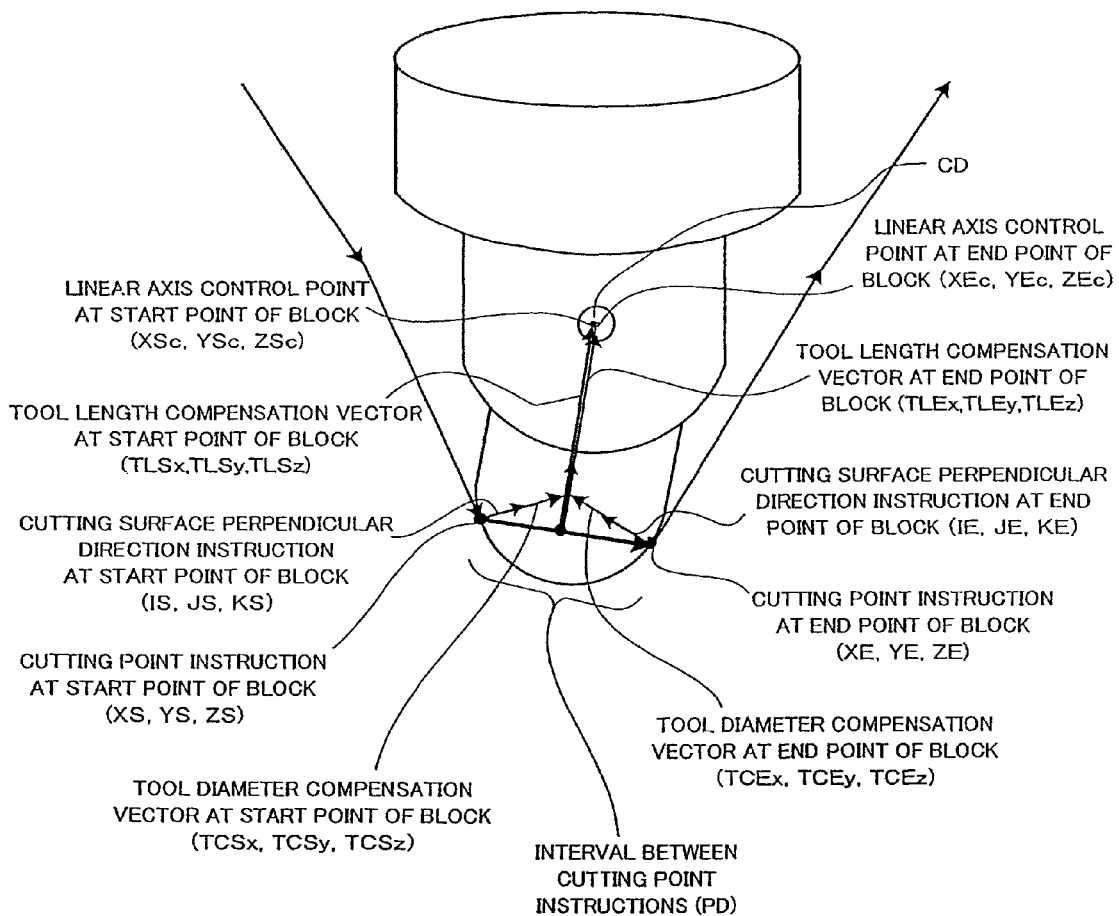
FIG. 14 is a diagram for describing a singular point determination process and a process for preventing unstable movement when a singular point has been determined, in a second embodiment of the numerical control method according to the present invention.

FIG. 14 is an illustrative diagram of processing for determining a singular point 2 and processing for avoiding movement which causes excessive cutting when a singular point 2 has been determined, as implemented in a second embodiment of a numerical control method according to the present invention.

The second embodiment relates to an example where the tool used is a ball end mill. In this FIG. 14, since the tool length compensation vector (TLSx, TLSy, TLSz) at the start point of a block and the tool length compensation vector (TLEx, TLEy, TLEz) at the end point of the block are close together in the proximity of a singular point 2, then for the sake of convenience, they are represented by the same arrow and position. Similarly, since the linear axis control point (XSc, YSc, ZSc) at the start point of a block and the linear axis control point (XEc, YEc, ZEc) at the end point of the block are close together in the proximity of a singular point 2, then for the sake of convenience, they are represented by the same arrow and the same position.

Figure 15:
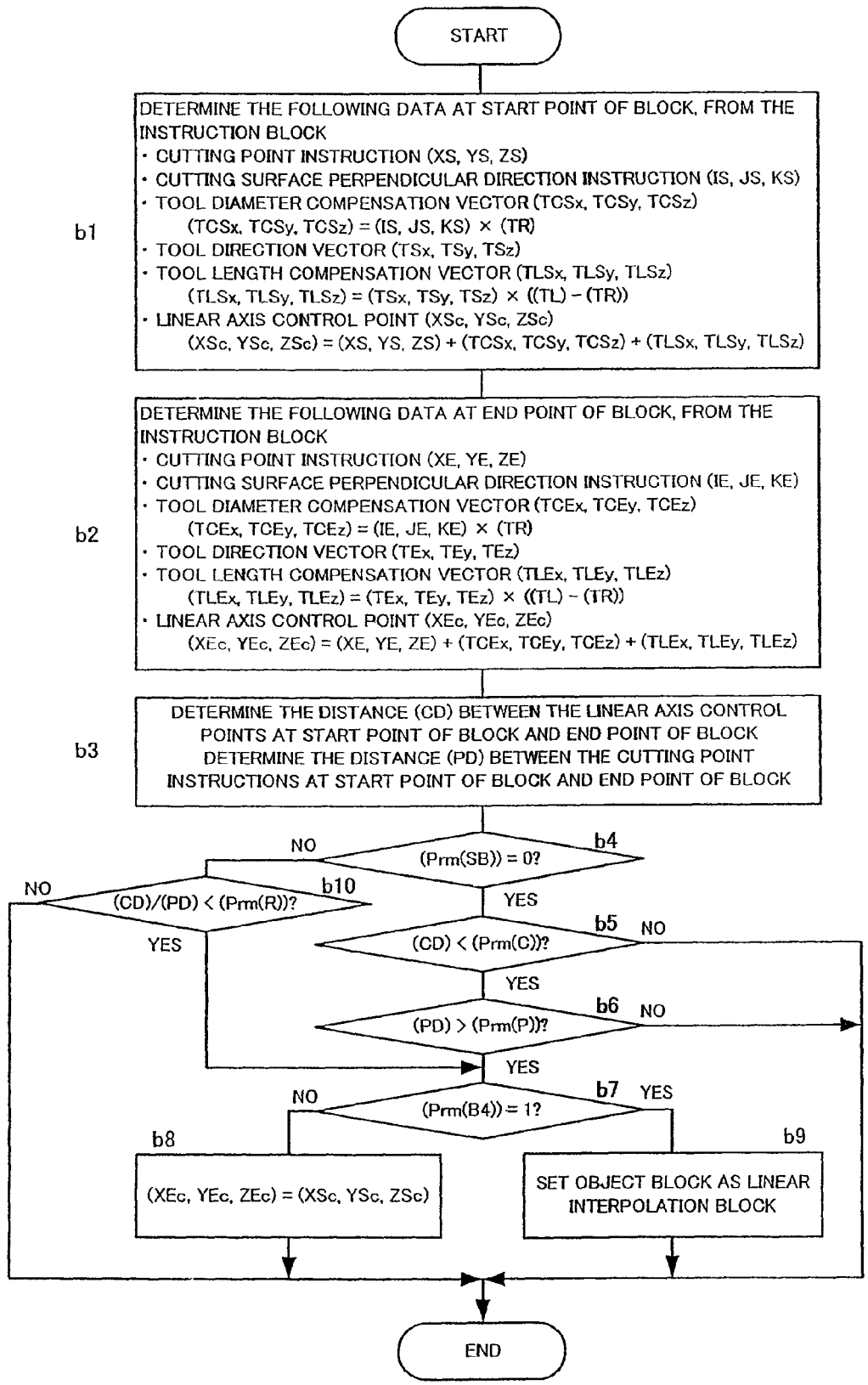
FIG. 15 is a flowchart of processing which is carried out in block units, showing an algorithm centered on a singular point determination process and a process for preventing unstable movement in the proximity of the singular point in the second embodiment of the numerical control method according to the present invention.

FIG. 15 is a flowchart of processing which is implemented in block units, and which illustrates an algorithm centered on processing for determining a singular point 2 and processing for preventing unstable movement in the proximity of the singular point, according to the second embodiment.

In the second embodiment, it is judged whether or not the tool is in the proximity of this singular point 2, on the basis of the distance between the position of the linear axis control point (XSc, YSc, ZSc) at the start point of a block and the position of the linear axis control point (XEc, YEc, ZEc) at the end point of the block, and the distance between the position of the cutting point instruction (XS, YS, ZS) at the start point of a block and the position of the cutting point instruction (XE, YE, ZE) at the end point of the block. In the proximity of a singular point, the occurrence of excessive cutting, or the like, in response to the existence of a singular point 2 is prevented, either by halting the movement of the linear axis control point in the current block or by moving the current block in a linear fashion.

(A) Consequently, a reference for judging whether the distance CD between the linear axis control point (XSc, YSc, ZSc) at the start point of a block and the linear axis control point (XEc, YEc, ZEc) at the end point of the block is small or not is established as a set parameter value (Prm(C)). Furthermore, a reference for judging whether the distance PD between the cutting point instruction (XS, YS, ZS) at the start point of a block and the cutting point instruction (XE, YE, ZE) at the end point of the block is large or not is established as a set parameter value (Prm(P)). Thereupon, it is judged whether or not the distance CD is smaller than the set value (Prm(C)) and whether or not the distance PD is larger than the set value (Prm(P)), for judging whether or not the tool is in the proximity of this singular point 2.

(B) Furthermore, as an alternative method for judging the singular point 2, a reference value for judging whether the ratio (CD/PD) between the distance CD from the linear axis control point (XSc, YSc, ZSc) at the start point of a block until the linear axis control point (XEc, YEc, ZEc) at the end point of the block, and the distance PD from the cutting point instruction (XS, YS, ZS) at the start point of a block until the cutting point instruction (XE, YE, ZE) at the end point of the block is small or not, is established as a set parameter value (Prm(R)).

It is possible to select which of the methods explained in (A) and (B) above to use for judging the singular point 2, and this selection is also set by means of a parameter. If the set value (Prm(SB)) is set to (Prm(SB))=0, then it is judged whether or not a singular point 2 is present by means of the method (A) described above (in other words, by judging whether or not the distances CD and PD are smaller or larger than respectively established set values). On the other hand, if the set value (Prm(SB))=1, then it is judged whether or not a singular point 2 is present by means of the method (B) described above (in other words, by judging whether or not CD/PD is smaller than the set value).

Moreover, in the present embodiment, if the tool is judged to be in the proximity of a singular point 2, then the linear axis control point position (XEc, YEc, ZEc) at the end point of a block is made identical to the linear axis control point position (XSc, YSc, ZSc) at the start point of the block, in such a manner that it is possible to select either to prevent the occurrence of movement of the linear axis control point, or to set a linear movement for the movement operation from the linear axis control point position (XSc, YSc, ZSc) at the start point of a block until the linear axis control point position (XEc, YEc, ZEc) at the end point of the block. This selection is set by a parameter, and if the set value (Prm(B4))=0, then there is no movement of the linear axis control point, and if the set value (Prm(B4))=1, then linear movement is selected. Instead of using an established parameter value to make the selection described above, it is also possible to use a program command or signal.

The instruction block is read in and the cutting point instruction (XS, YS, ZS) and the cutting surface perpendicular direction instruction (IS, JS, KS) at the start point of the block thus read in is determined. The tool diameter compensation vector (TCSx, TCSy, TCSz) at the start point of the block is determined by multiplying the cutting surface perpendicular direction instruction (IS, JS, KS) at the start point of the block by the tool diameter compensation amount TR. The cutting surface perpendicular direction instruction (IS, JS, KS) is a unit vector. Furthermore, the tool direction vector (TSx, TSy, TSz) at the start point of a block is determined from the indicated tool direction instructions A, C at the start point of a block and the end point of the block. The tool length compensation vector (TLSx, TLSy, TLSz) at the start point of the block is determined by multiplying the compensation amount differential (tool length compensation amount TL−tool diameter compensation amount TR) by the tool direction vector (TSx, TSy, TSz) at the start point of the block thus determined. The tool diameter compensation vector (TCSx, TCSy, TCSz) at the start point of a block and the tool length compensation vector (TLSx, TLSy, TLSz) at the start point of the block are added to the cutting point instruction (XS, YS, ZS) at the start point of the block, thereby determining the linear axis control point (XSc, YSc, ZSc) at the start point of the block (step b1).

The processing for determining the linear axis control point (XSc, YSc, ZSc) at the start point uses the same method for determining the linear axis control point (Xc, Yc, Zc) at an interpolation point, as described above, and further details thereof are omitted here.

Next, the cutting point instruction (XE, YE, ZE) and the cutting surface perpendicular direction instruction (IE, JE, KE) at the end point of the block are determined. The tool diameter compensation vector (TCEx, TCEy, TCEz) at the end point of the block is determined by multiplying the tool diameter compensation amount TR by the cutting surface perpendicular direction instruction (IE, JE, KE). The cutting surface perpendicular direction instruction (IE, JE, KE) is a unit vector. The tool direction vector (TEx, TEy, TEz) at the end point of the block is determined on the basis of the indicated tool direction instructions A, C for the start point of the block and the end point of the block. The tool length compensation vector (TLEx, TLEy, TLEz) at the end point of the block is determined by multiplying the compensation amount differential (tool length compensation amount TL−tool diameter compensation amount TR) by the tool direction vector (TEx, TEy, TEz) at the end point of the block.

The linear axis control point (XEc, YEc, ZEc) at the end point of the block is determined by adding the tool diameter compensation vector (TCEx, TCEy, TCEz) at the end point of the block and the tool length compensation vector (TLEx, TLEy, TLEz) at the end point of the block to the cutting point instruction (XE, YE, ZE) at the end point of the block (step b2).

The processing for determining the linear axis control point (XEc, YEc, ZEc) at the end point is the same as the processing for determining the linear axis control point (Xc, Yc, Zc) at an interpolation point as described above, and further explanation thereof is omitted here.

Furthermore, the end point of one block is the start point of the next block, and therefore the data determined for the end point of a block can be used as the data for the start point of the next block. Consequently, in the next block, the processing in step b1 can replace the respective data for the end point of the block which was determined at step b2 in the previous cycle, with the data of the start point of the current block.

Moreover, the distance CD between the linear axis control point (XSc, YSc, ZSc) at the start point of a block and the linear axis control point (XEc, YEc, ZEc) at the end point of the block, and the distance PD between the cutting point instruction (XS, YS, ZS) at the start point of the block and the cutting point instruction (XE, YE, ZE) at the end point of the block, are determined (step b3).

It is then judged whether or not the value of the set parameter (Prm(SB)) is "0" (step b4), and if it is set to "0", then it is judged whether the distances CD and PD are respectively smaller or greater than the set value. Therefore, firstly, it is judged whether the determined distance CD between the linear axis control points at the start point and the end point of the block is smaller than the set value (Prm(C)) (step b5). If the distance CD is equal to or greater than the set value (Prm(C)), then the current processing is terminated. On the other hand, if the distance CD is smaller than the set value (Prm(C)), then it is subsequently judged whether or not the distance PD between the cutting point instructions at the start point and the end point of the block is greater than a set value (Prm(P)) (step b6). If the distance PD is equal to or less than the set value (Prm(P)), then the current processing is terminated. On the other hand, if the distance PD is greater than the set value (Prm(P)), then it is judged that the tool is in the proximity of a singular point 2, and the procedure proceeds to the step b7.

In other words, if the distance CD between the linear axis control points at the start point and end point of a block is small, and if the distance PD between the cutting point instructions at the start point and the end point of the block is large, then it is judged that the processing to be performed on the basis of the instructions in the current block is processing in the proximity of a singular point 2.

On the other hand, if the value of the set parameter (Prm(SB)) is set to "1", then it is judged whether or not the ratio (CD/PD) of the distances CD and PD is smaller than the set value (Prm(R)), and if it is not smaller, then it is considered that the processing is not in the proximity of a singular point 2, and the current processing is terminated. On the other hand, if the ratio (CD/PD) of the distances CD and PD is smaller than the set value (Prm(R)), then it is judged that the processing is in the proximity of a singular point 2, and the procedure proceeds to step b7.

If the processing is judged to be in the proximity of a singular point 2 in this way, then at step b7, it is judged whether or not the set value (Prm(B4)) is set to "1". If the set value (Prm(B4))=0, then the linear axis control point position (XEc, YEc, ZEc) at the end point of a current block is set to be a linear axis control point position (XSc, YSc, ZSc) at the start point of the current block (step b8). Consequently, when the interpolation processing of the current block is carried out, no movement instructions are issued to the linear axes X, Y, Z. On the other hand, if the set parameter (Prm(B4)) is set to "1", then a linear movement is instructed to the linear axes for the current block, as the movement instruction from the linear axis control point position (XSc, YSc, ZSc) at the start point of a block, to the linear axis control point position (XEc, YEc, ZEc) at the end point of the block (step b9). By this means, unstable loop-shaped movement is prevented from occurring, and it is possible to prevent excessive cutting into the processing object.

The second embodiment described above relates to an example where a ball end mill is used as the tool, but the phenomenon of the singular point 2 also occurs in cases where the tool is a square end mill or a radius end mill. Consequently, in cases where the tool used is a square end mill or a radius end mill also, it is similarly possible to prevent the occurrence of a loop-shaped unstable movement and to prevent excessive cutting into the processing object, by determining the proximity of the singular point 2 and by carrying out processing similar to the foregoing.

If the tool used is a square end mill or a radius end mill, rather than a ball end mill, then only the data determined in step b1 and step b2 in FIG. 15 are different, and the processing in step b3 and following steps is the same.

In the case of a square end mill, the following data are determined at the start point:
cutting point instruction (XS, YS, ZS);
cutting surface perpendicular direction instruction (IS, JS, KS);
tool diameter compensation vector (TCSx, TCSy, TCSz);
tool direction vector (TSx, TSy, TSz);
tool length compensation vector (TLSx, TLSy, TLSz);
linear axis control point (XSc, YSc, ZSc); and
(XSc, YSc, ZSc)=(XS, YS, ZS)+(TCSx, TCSy, TCSz)+(TLSx, TLSy, TLSz).

Furthermore, the following data is determined at the end point:
cutting point instruction (XE, YE, ZE);
cutting surface perpendicular direction instruction (IE, JE, KE);
tool diameter compensation vector (TCEx, TCEy, TCEz);
tool direction vector (TEx, TEy, TEz);
tool length compensation vector (TLEx, TLEy, TLEz);
linear axis control point (XEc, YEc, ZEc); and
(XEc, YEc, ZEc)=(XE, YE, ZE)+(TCEx, TCEy, TCEz)+(TLEx, TLEy, TLEz).

Figure 1:
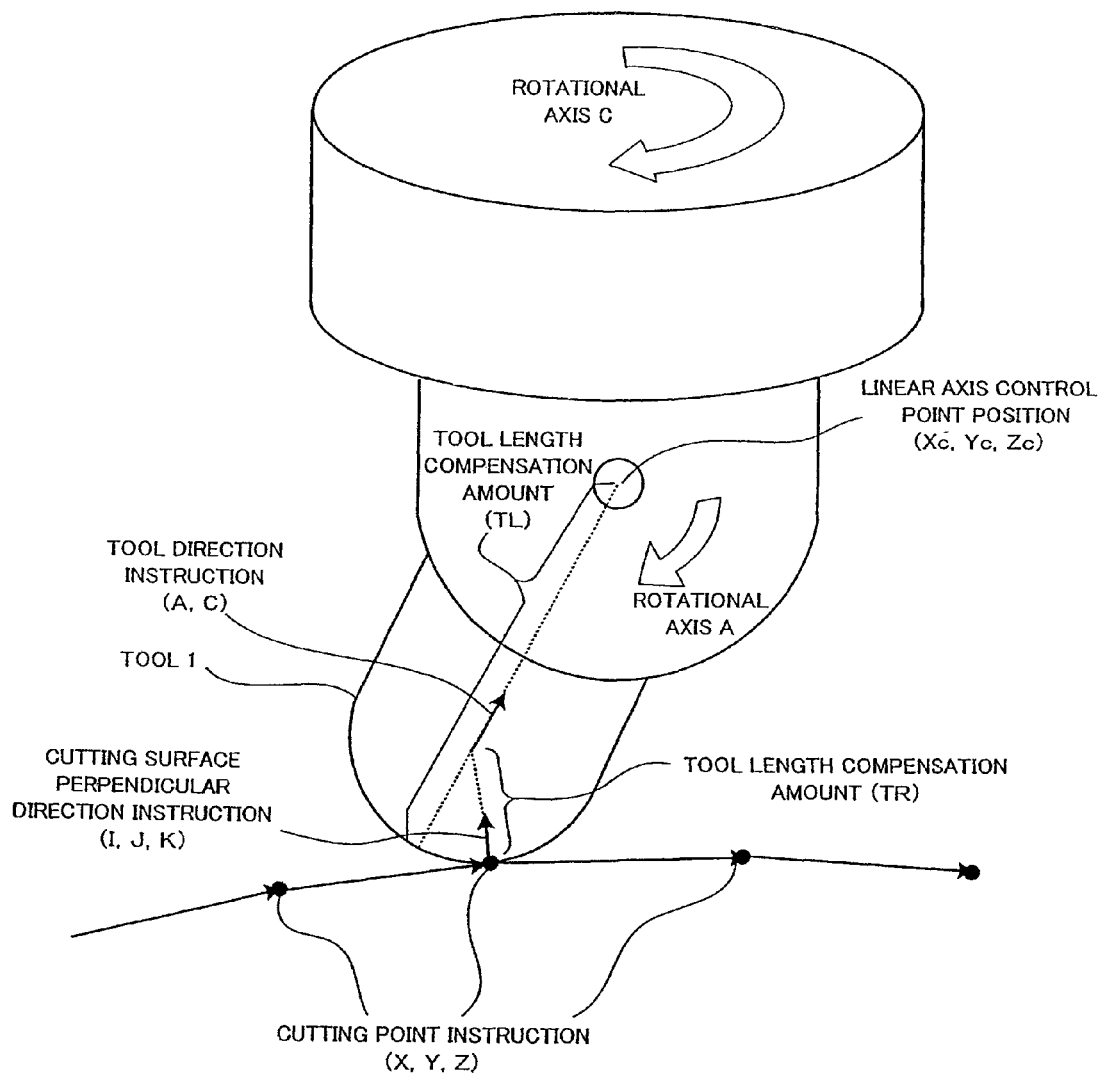
FIG. 1 is a diagram for describing the relationship between an instructed cutting point and a controlled tool position, when using a ball end mill as a tool, in a five-axis processing machine.
Figure 2:
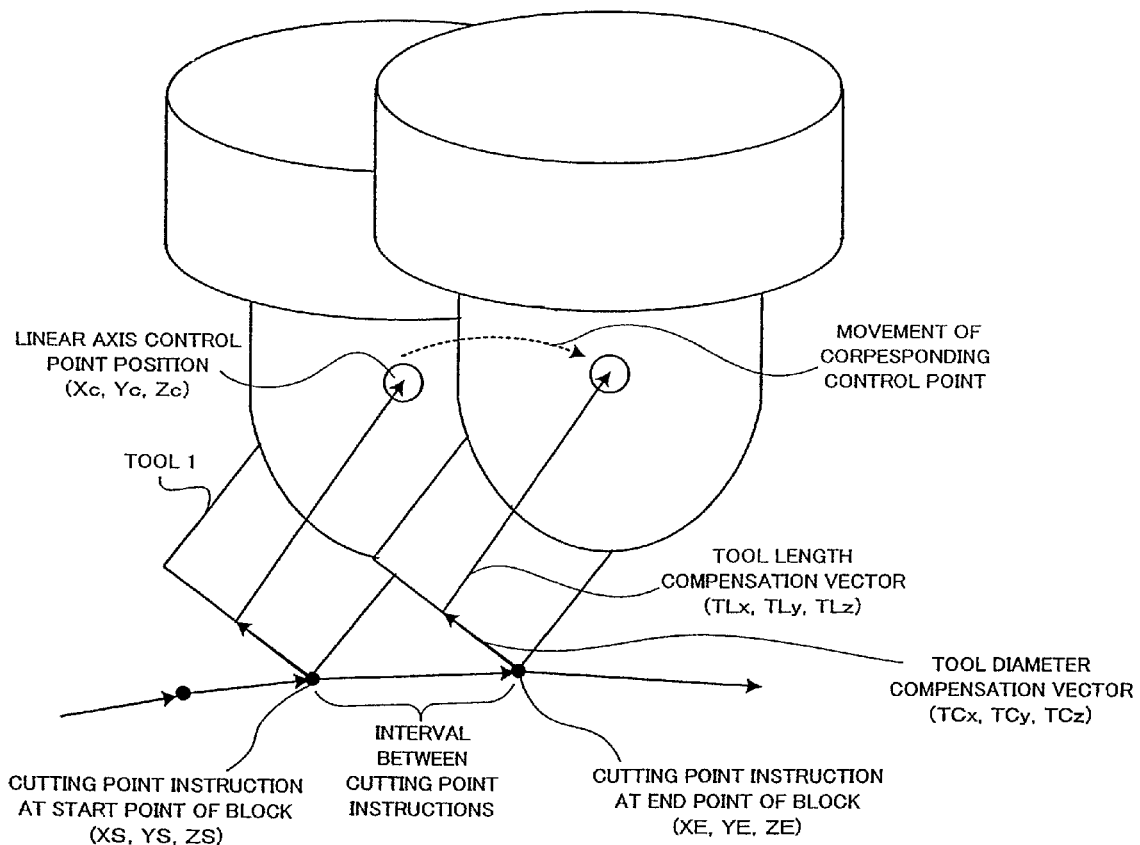
FIG. 2 is a diagram for describing the relationship between a cutting point and a control point in a general cutting point command, in the case of a square end mill.
Figure 3:
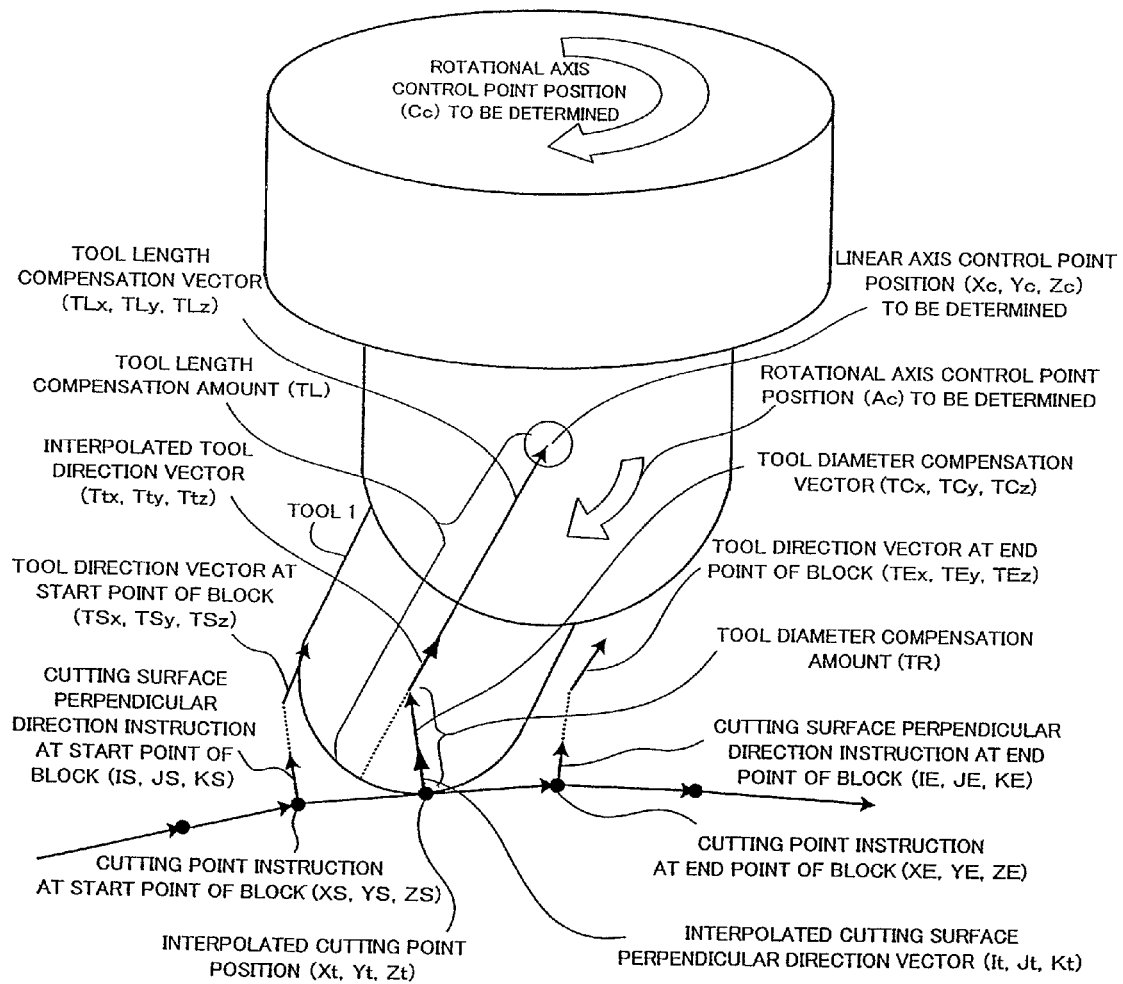
FIG. 3 is a diagram for describing movement when the positions of three linear axes X, Y, Z and two rotational axes A, C are determined and controlled on the basis of cutting point instructions, in a case where a ball end mill is used as a tool.
Figure 6:
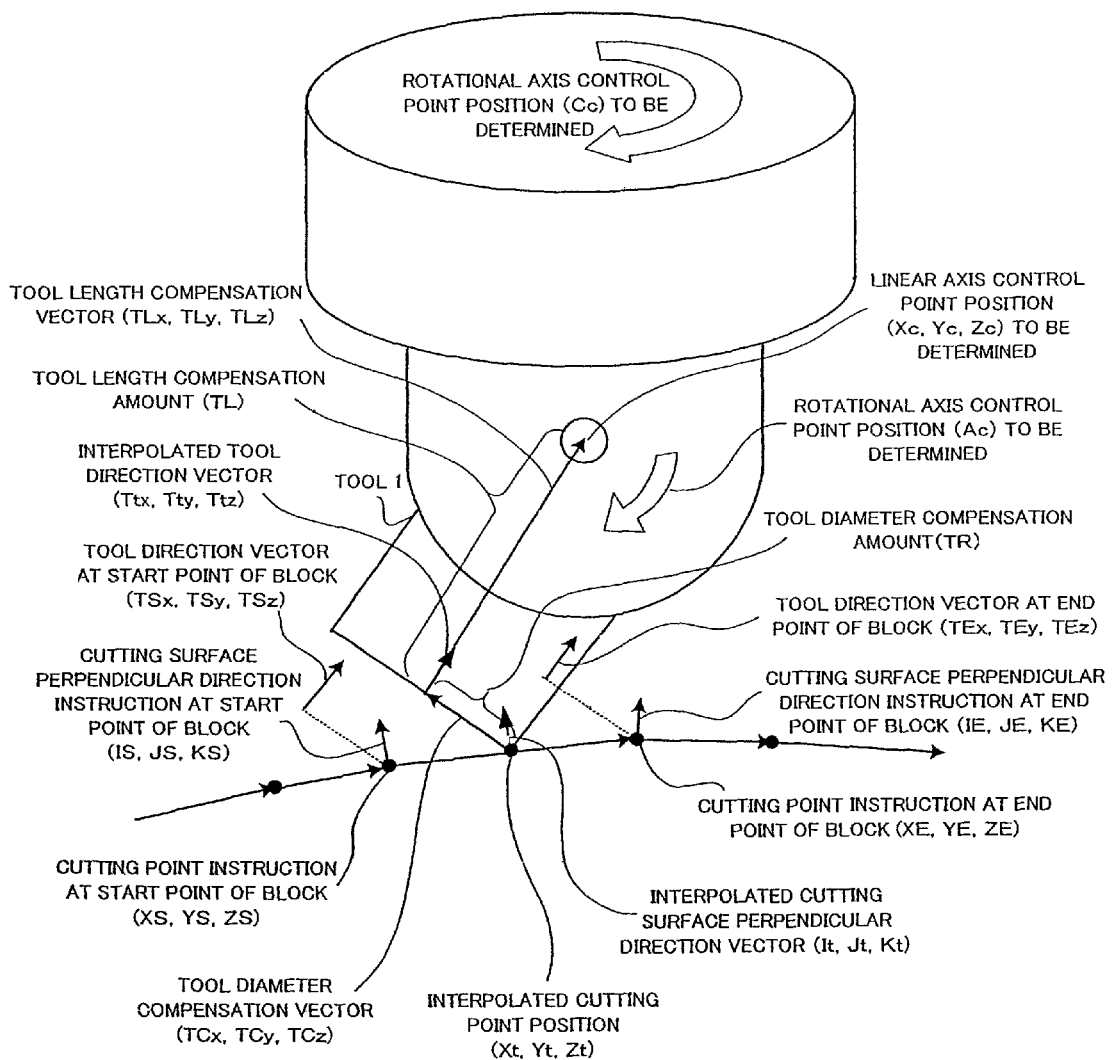
FIG. 6 is a diagram for describing movement when the positions of three linear axes, X, Y, Z and two rotational axes, A, C, are determined and controlled on the basis of cutting point instructions, in a case where the tool used is a square end mill.

The method for determining the tool diameter compensation vector, the tool direction vector, and the tool length compensation vector at the start point and the end point of the block is the same as the method for determining the tool diameter compensation vector, the tool direction vector and the tool length compensation vector at an interpolation point as shown in FIG. 6, and further explanation thereof is omitted here.

In the case of a radius end mill;
the following data are determined at the start point:
cutting point instruction (XS, YS, ZS);
cutting surface perpendicular direction instruction (IS, JS, KS);
corner radius compensation vector (CCSx, CCSy, CCSz);
tool diameter compensation vector (TCSx, TCSy, TCSz);
tool direction vector (TSx, TSy, TSz);
tool length compensation vector (TLSx, TLSy, TLSz);
linear axis control point (XSc, YSc, ZSc); and
(XSc, YSc, ZSc)=(XS, YS, ZS)+(CCSx, CCSy, CCSz)+(TCSx, TCSy, TCSz)+(TLSx, TLSy, TLSz).

Furthermore, the following data are determined at the end point:
cutting point instruction (XE, YE, ZE);
cutting surface perpendicular direction instruction (IE, JE, KE);
corner radius compensation vector (CCEx, CCEy, CCEz);
tool diameter compensation vector (TCEx, TCEy, TCEz);
tool direction vector (TEx, TEy, TEz);
tool length compensation vector (TLEx, TLEy, TLEz);
linear axis control point (XEc, YEc, ZEc); and
(XEc, YEc, ZEc)=(XE, YE, ZE)+(CCEx, CCEy, CCEz)+(TCEx, TCEy, TCEz)+(TLEx, TLEy, TLEz).

The method for determining the corner radius compensation vector, the tool diameter compensation vector, the tool direction vector, and the tool length compensation vector at the start point and the end point of the block is the same as the method for determining the tool diameter compensation vector, the tool direction vector and the tool length compensation vector at an interpolation point as shown in FIG. 7, and further explanation thereof is omitted here.

What is claimed is:

1. A numerical control method for controlling a five-axis processing machine having three linear axes and two rotational axes, in which a milling tool which does not have a corner radius section or a ball end mill is used, linear axis control points and rotational axis control points are determined at respective interpolation cycles, based on a tool diameter compensation amount and a tool length compensation amount which are set in advance, and also on cutting points, a cutting surface perpendicular direction and a tool direction which are instructed by a processing program, and in which the respective axes are driven and controlled to positions of the respective control points thus determined,
the method comprising the steps of:
determining a cutting point position and a linear axis control point respectively at a start point and an end point for each of blocks thereof; and
assuming that the linear axis control point at the end point of the current block is equal to the linear axis control point at the start point of the current block so that movement of the linear axis in accordance with the instructions in the current block does not occur, when judgment is made that a distance between the linear axis control points at the start point and the end point of the block is smaller than a predetermined second set value, and that a distance between the cutting point positions at the start point and the end point of the block is greater than a predetermined third set value, or when judgment is made that a ratio of the distance between the linear axis control points at the start point and the end point of the block to the distance between the cutting point positions at the start point and the end point of the block is less than a predetermined fourth set value.

2. A numerical control method for controlling a five-axis processing machine having three linear axes and two rotational axes, in which a milling tool which does not have a corner radius section or a ball end mill is used, linear axis control points and rotational axis control points are determined at respective interpolation cycles, based on a tool diameter compensation amount and a tool length compensation amount which are set in advance, and also on cutting points, a cutting surface perpendicular direction and a tool direction which are instructed by a processing program, and in which the respective axes are driven and controlled to positions of the respective control points thus determined, the method comprising the steps of:

determining a cutting point position and a linear axis control point respectively at a start point and an end point for each of blocks thereof; and setting the instruction of the current block to a linear movement instruction, when judgment is made that a distance between the linear axis control points at the start point and the end point of the block is smaller than a predetermined second set value, and that a distance between the cutting point positions at the start point and the end point of the block is greater than a predetermined third set value, or when judgment is made that a ratio of the distance between the linear axis control points at the start point and the end point of the block to the distance between the cutting point positions at the start point and the end point of the block is less than a predetermined fourth set value.

3. A numerical control method for controlling a five-axis processing machine having three linear axes and two rotational axes, in which a milling tool which has a corner radius section is used, linear axis control points and rotational axis control points are determined at respective interpolation cycles, based on a predetermined tool diameter compensation amount, a corner radius compensation amount and a tool length compensation amount which are set in advance, and also on cutting points, a cutting surface perpendicular direction and a tool direction which are instructed by a processing program, and in which the respective axes are driven and controlled to positions of the respective control points thus determined, the method comprising the steps of:

determining a cutting point position and a linear axis control point respectively at a start point and an end point for each of blocks thereof; and assuming that the linear axis control point at the end point of the current block is equal to the linear axis control point at the start point of the current block so that movement of the linear axis in accordance with the instructions in the current block does not occur, when judgment is made that a distance between the linear axis control points at the start point and the end point of the block is smaller than a predetermined second set value, and that a distance between the cutting point positions at the start point and the end point of the block is greater than a predetermined third set value, or when judgment is made that a ratio of the distance between the linear axis control points at the start point and the end point of the block to the distance between the cutting point positions at the start point and the end point of the block is less than a predetermined fourth set value.

4. A numerical control method for controlling a five-axis processing machine having three linear axes and two rotational axes, in which a milling tool which has a corner radius section is used, linear axis control points and rotational axis control points are determined at respective interpolation cycles, based on a predetermined tool diameter compensation amount, a corner radius compensation amount and a tool length compensation amount which are set in advance, and also on cutting points, a cutting surface perpendicular direction and a tool direction which are instructed by a processing program, and in which the respective axes are driven and controlled to positions of the respective control points thus determined, the method comprising the steps of:

determining a cutting point position and a linear axis control point respectively at a start point and an end point for each of blocks thereof; and setting the instruction of the current block to a linear movement instruction, when judgment is made that a distance between the linear axis control points at the start point and the end point of the block is smaller than a predetermined second set value, and that a distance between the cutting point positions at the start point and the end point of the block is greater than a predetermined third set value, or when judgment is made that a ratio of the distance between the linear axis control points at the start point and the end point of the block to the distance between the cutting point positions at the start point and the end point of the block is less than a predetermined fourth set value.

* * * * *